United States Patent
Noda

(10) Patent No.: US 8,253,845 B2
(45) Date of Patent: Aug. 28, 2012

(54) ZOOM LENS AND IMAGING APPARATUS

(75) Inventor: Taiga Noda, Saitama (JP)

(73) Assignee: Fujifilm Corporation, Tokyo (JP)

( * ) Notice: Subject to any disclaimer, the term of this patent is extended or adjusted under 35 U.S.C. 154(b) by 78 days.

(21) Appl. No.: 13/022,643

(22) Filed: Feb. 8, 2011

(65) Prior Publication Data

US 2011/0194016 A1    Aug. 11, 2011

(30) Foreign Application Priority Data

Feb. 8, 2010    (JP) .................................. 2010-025790

(51) Int. Cl.
*H04N 5/225* (2006.01)
(52) U.S. Cl. ......... 348/340; 348/345; 348/348; 348/294
(58) Field of Classification Search .................. 348/340, 348/345, 348, 294; 359/682, 687; 396/72–88
See application file for complete search history.

(56) References Cited

U.S. PATENT DOCUMENTS

| | | | | |
|---|---|---|---|---|
| 5,134,524 A | * | 7/1992 | Hamano et al. ............... | 359/687 |
| 5,694,253 A | * | 12/1997 | Shibayama .................... | 359/690 |
| 7,738,183 B2 | * | 6/2010 | Ito ................................. | 359/682 |

FOREIGN PATENT DOCUMENTS

| | | |
|---|---|---|
| JP | 2005-326743 | 11/2005 |
| JP | 2009-310223 | 12/2008 |

\* cited by examiner

*Primary Examiner* — Yogesh Aggarwal
(74) *Attorney, Agent, or Firm* — Young & Thompson

(57) ABSTRACT

First lens-group is composed of a negative lens and a positive lens. When magnification is changed from wide end to tele end, a distance between first lens-group and second lens-group increases, and a distance between second lens-group and third lens-group decreases. Specifically, first lens-group moves toward the object side, second lens-group moves along a path convex toward the image side, third lens-group monotonously moves only toward the object side, and fourth lens-group moves along a path convex toward the object side. Further, the following formulas are satisfied:

$$0.3 < X1/ft < 0.5 \qquad (1); \text{and}$$

$$5.0 < f1/fw < 7.0 \qquad (2),$$

where X1: the amount of movement of first lens-group when magnification is changed from wide end to tele end, ft: the focal length of the entire system at tele end, f1: a combined focal length of first lens-group, and fw: the focal length of the entire system at wide end.

11 Claims, 26 Drawing Sheets

EXAMPLE 1

EXAMPLE 10

EXAMPLE 2 · WIDE END

Fno. =3.70, ω=41.3°
- 587.6nm
- 460.0nm
- 615.0nm
-0.3mm 0.3mm SPHERICAL ABERRATION
FIG.16A

ω=41.3°
— SAGITTAL
······ TANGENTIAL
-0.3mm 0.3mm ASTIGMATISM
FIG.16B

ω=41.3°
-5% 5% DISTORTION
FIG.16C

ω=41.3°
······ 460.0nm
— 615.0nm
-10μm 10μm LATERAL CHROMATIC ABERRATION
FIG.16D

EXAMPLE 2 · MIDDLE

Fno. =4.59
- 587.6nm
- 460.0nm
- 615.0nm
-0.3mm 0.3mm SPHERICAL ABERRATION
FIG.17A

ω=19.5°
— SAGITTAL
······ TANGENTIAL
-0.3mm 0.3mm ASTIGMATISM
FIG.17B

ω=19.5°
-5% 5% DISTORTION
FIG.17C

ω=19.5°
······ 460.0nm
— 615.0nm
-10μm 10μm LATERAL CHROMATIC ABERRATION
FIG.17D

EXAMPLE 2 · TELE END

Fno. =6.06
- 587.6nm
- 460.0nm
- 615.0nm
-0.3mm 0.3mm SPHERICAL ABERRATION
FIG.18A

ω=8.8°
— SAGITTAL
······ TANGENTIAL
-0.3mm 0.3mm ASTIGMATISM
FIG.18B

ω=8.8°
-5% 5% DISTORTION
FIG.18C

ω=8.8°
······ 460.0nm
— 615.0nm
-10μm 10μm LATERAL CHROMATIC ABERRATION
FIG.18D

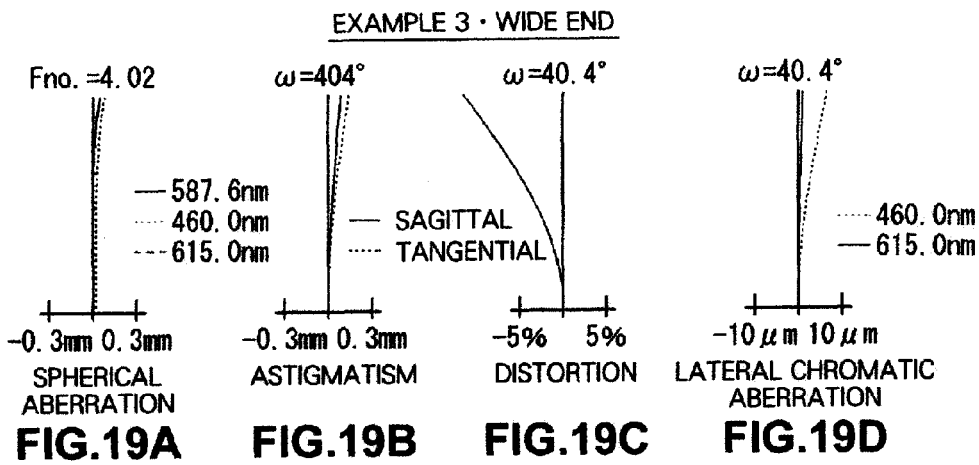
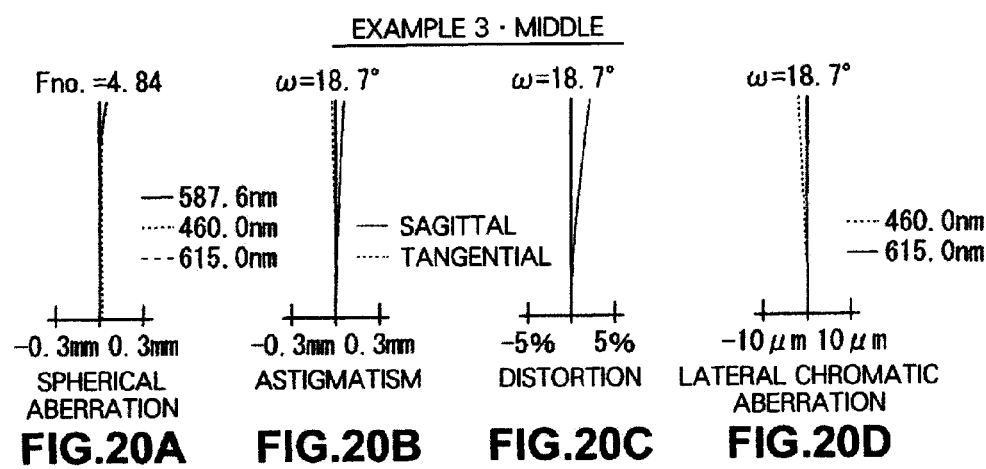
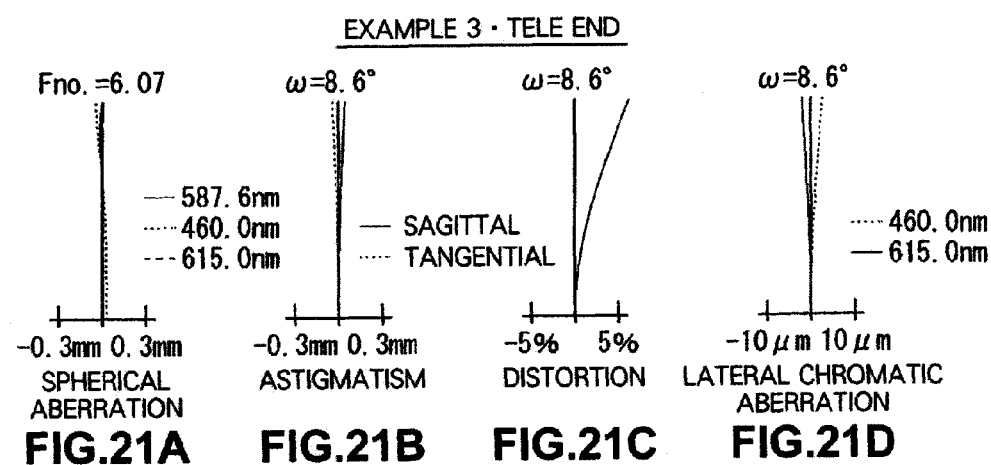

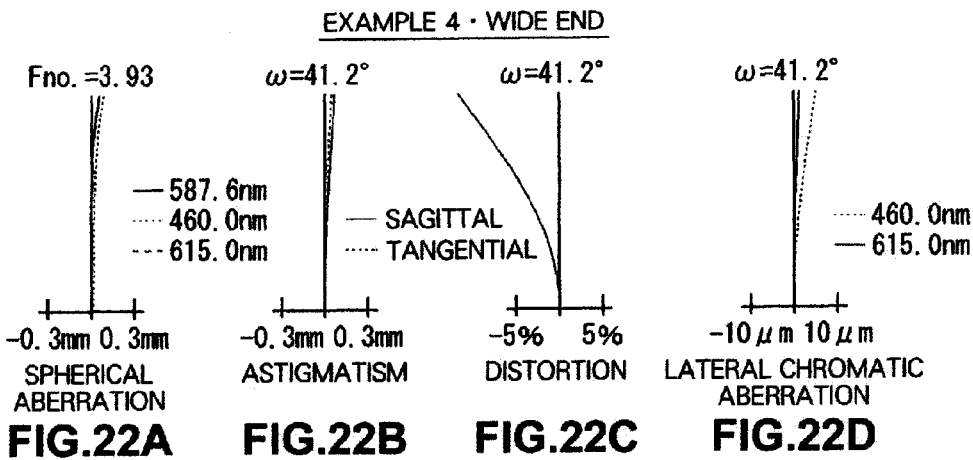
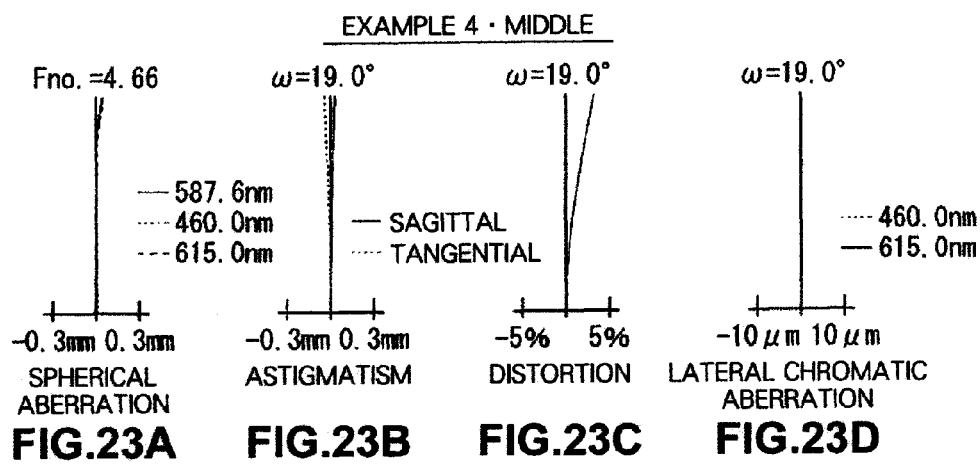
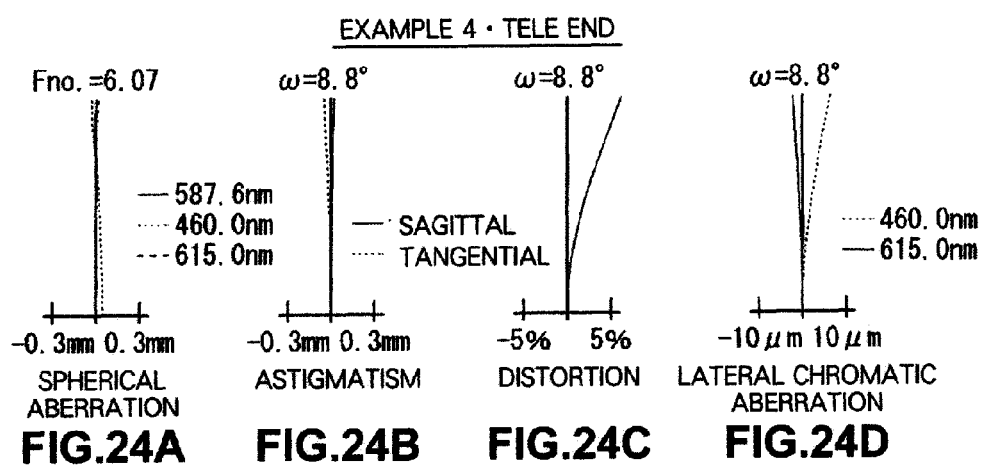

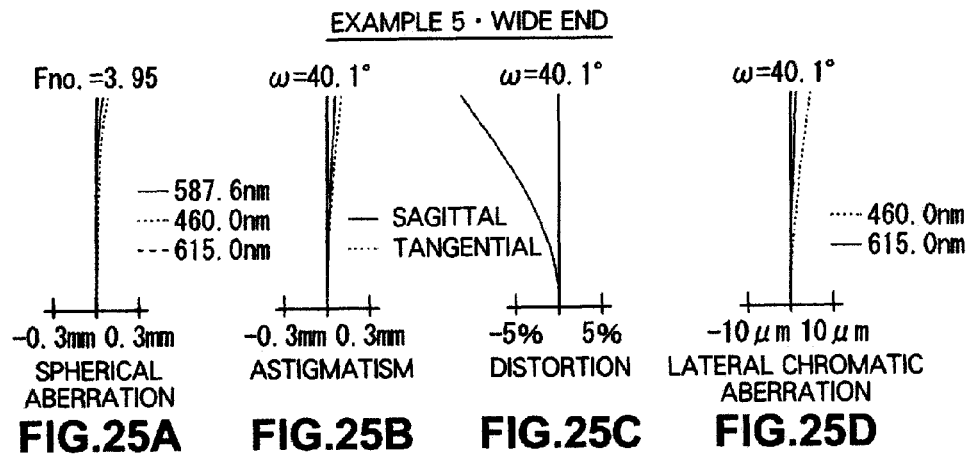
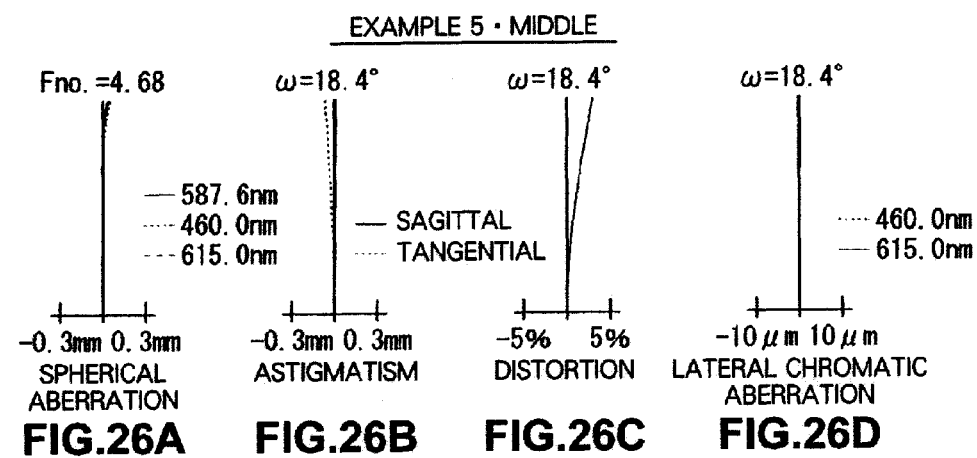
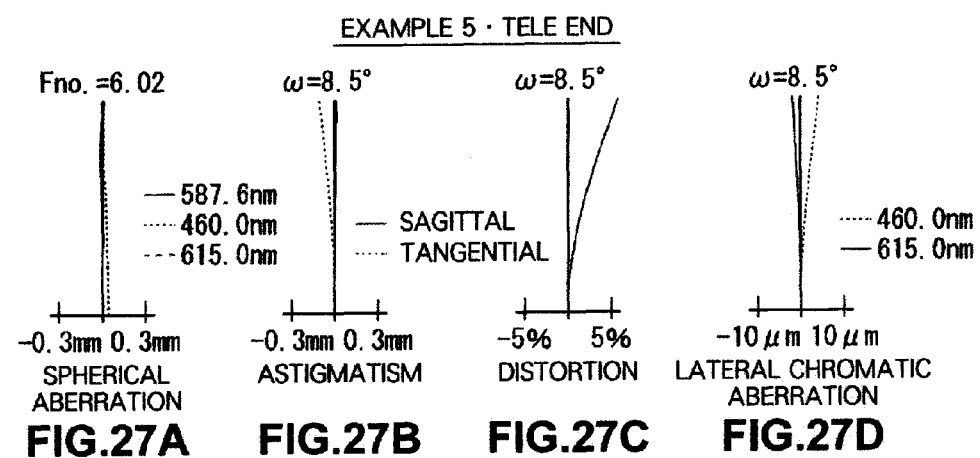

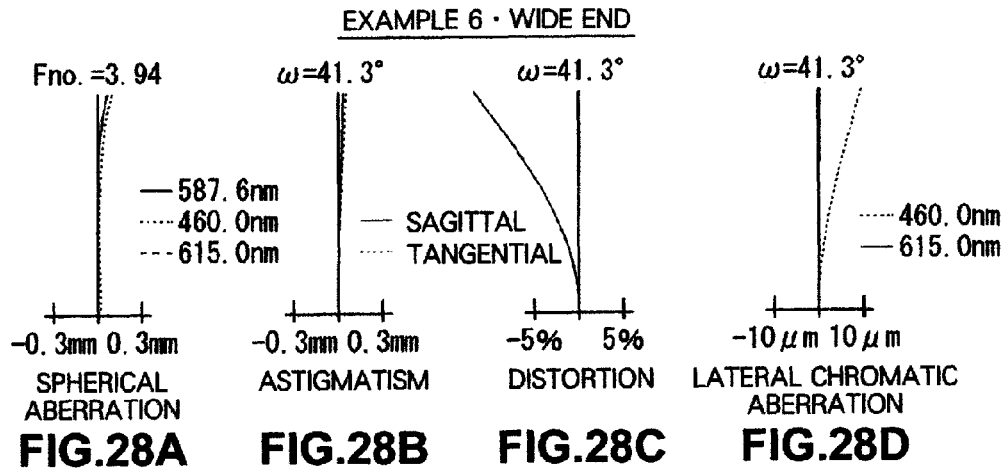
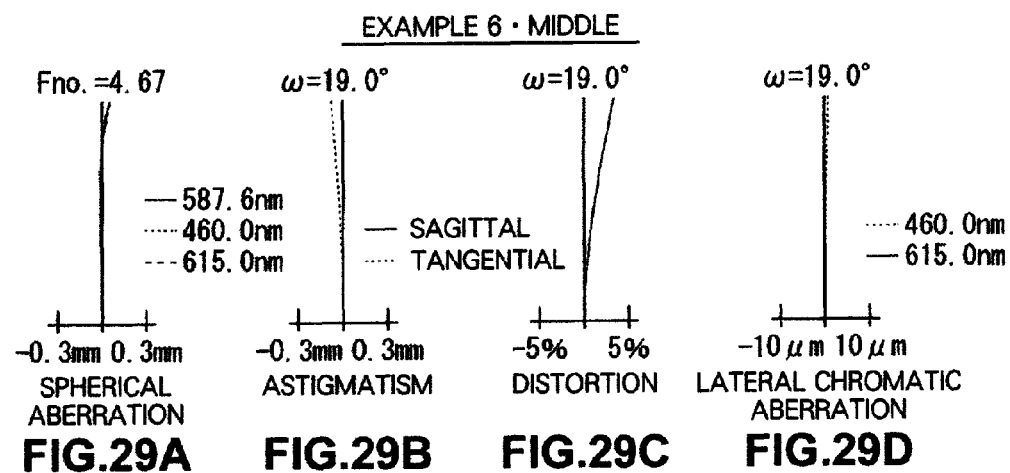
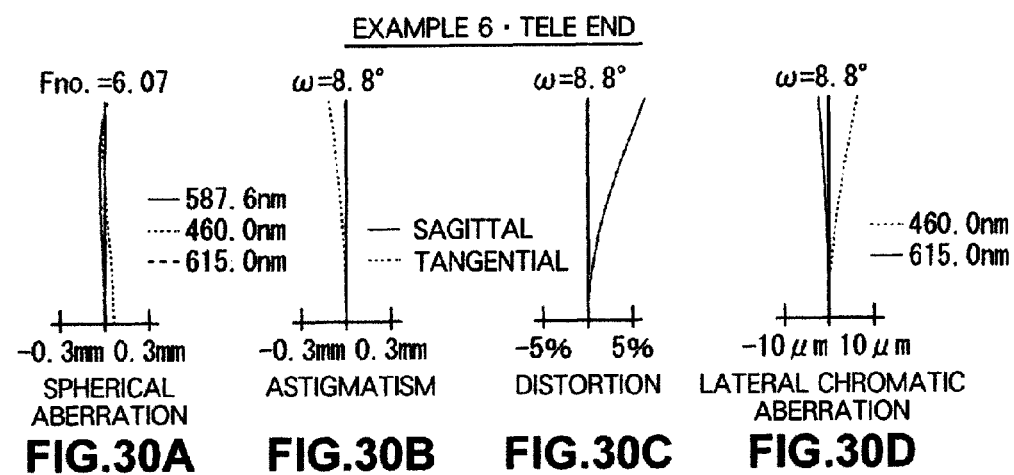

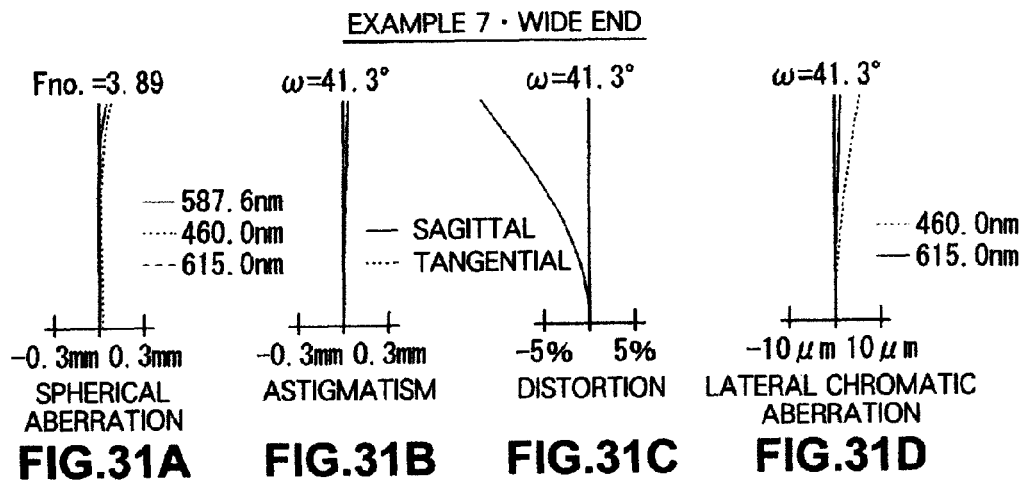
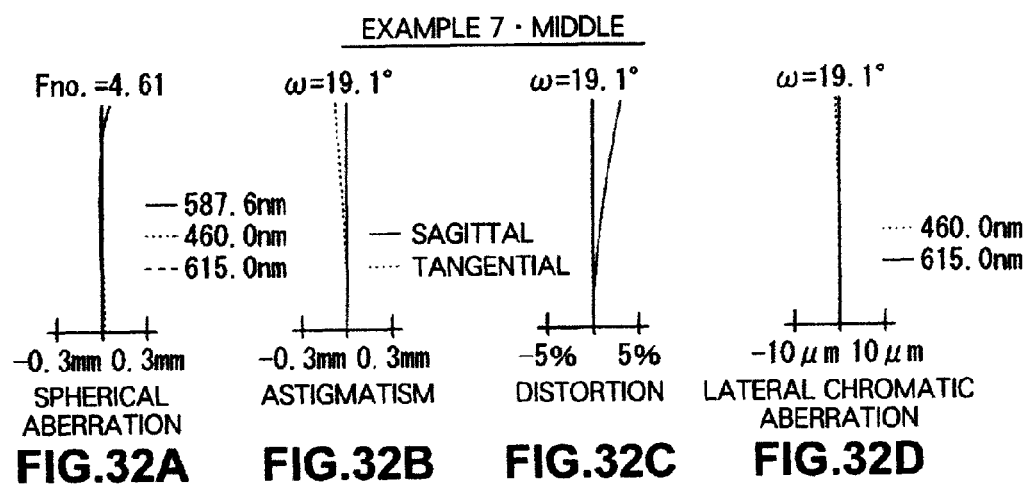
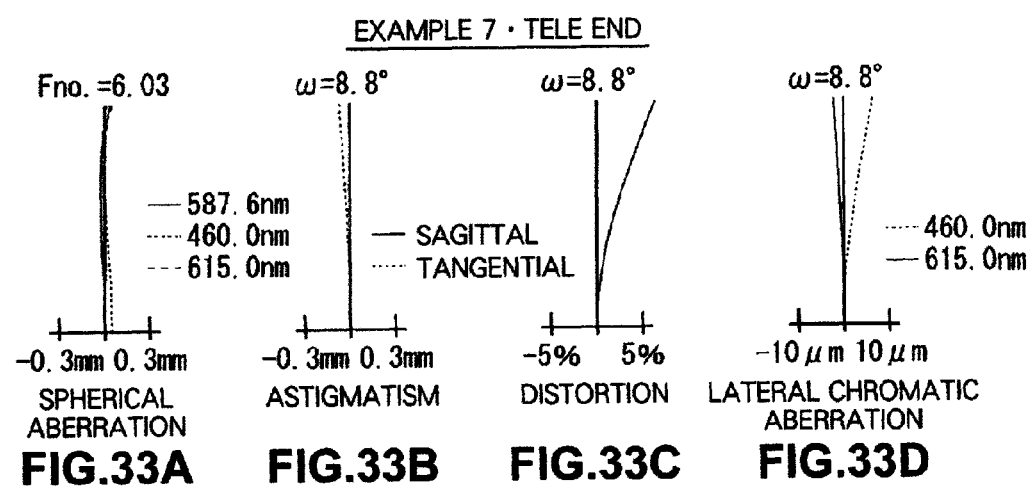

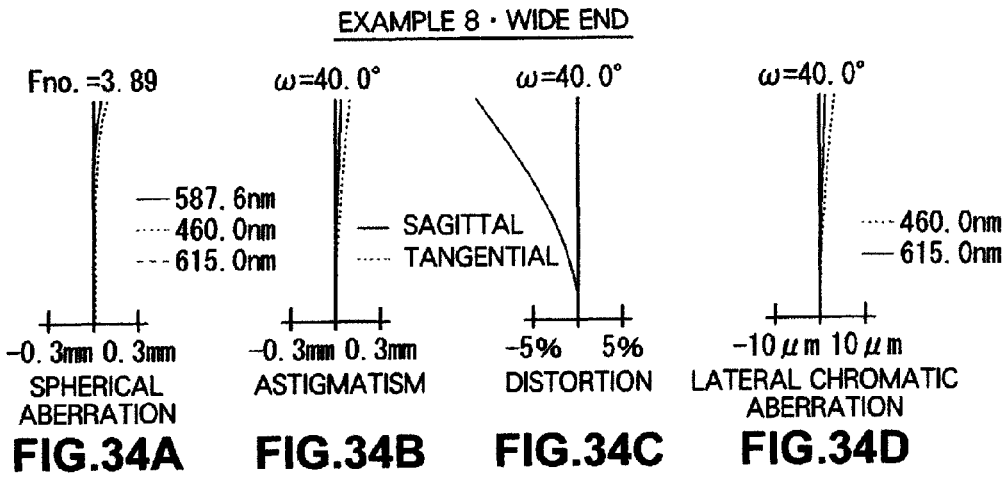
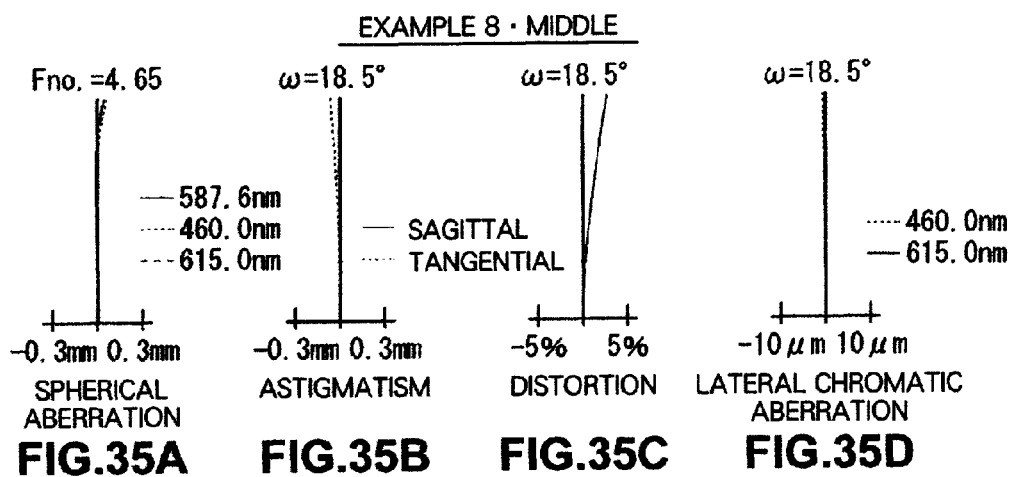
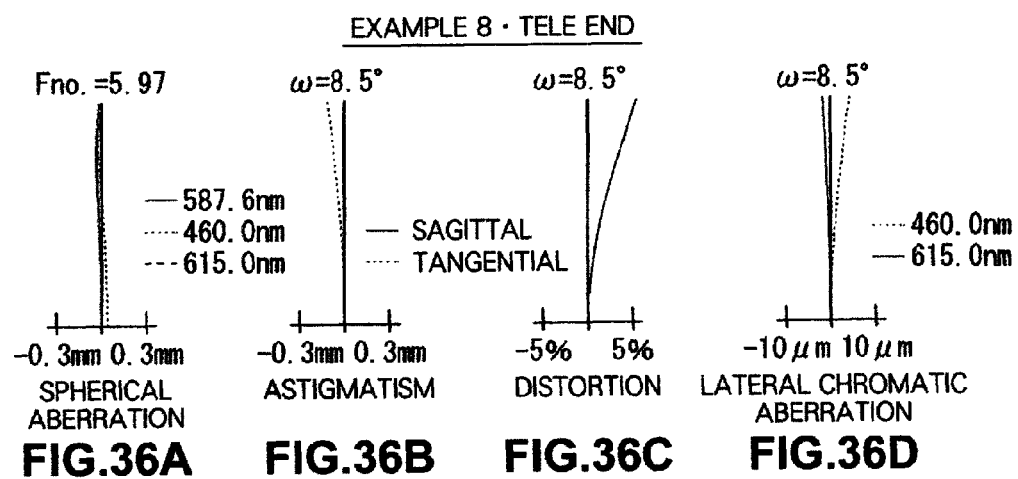

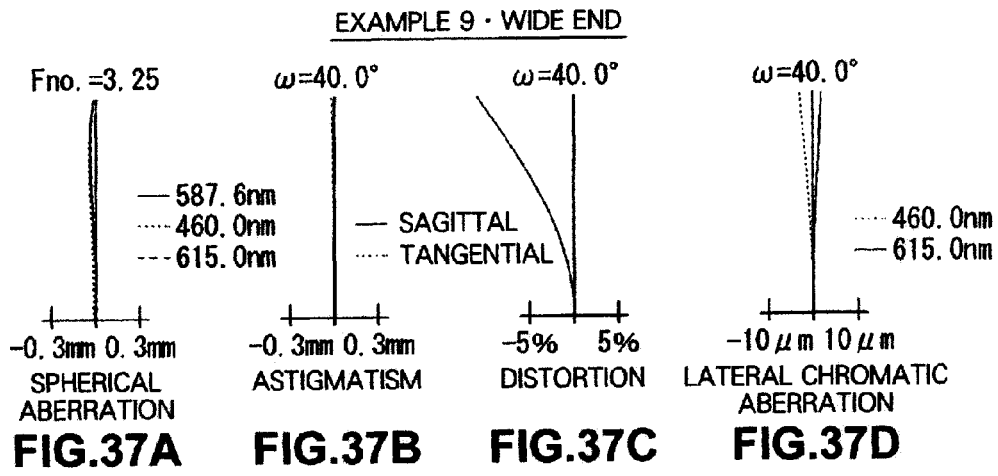
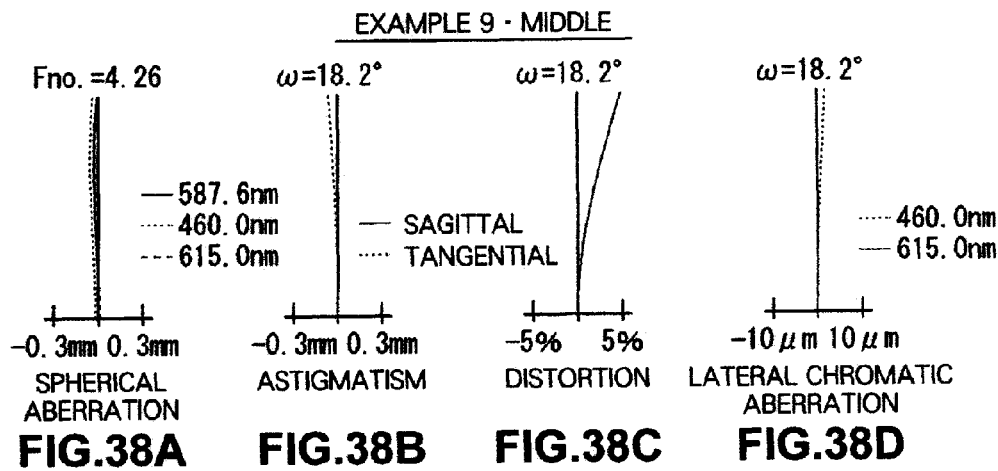
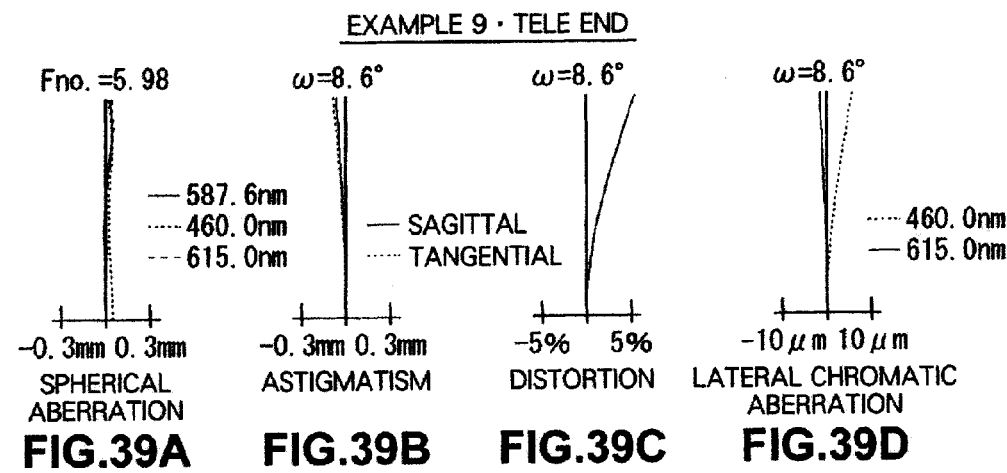

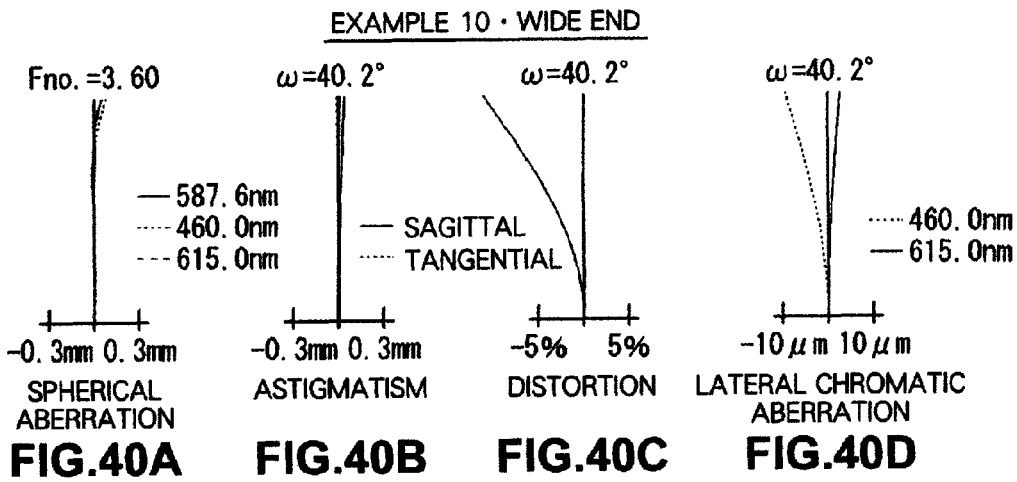
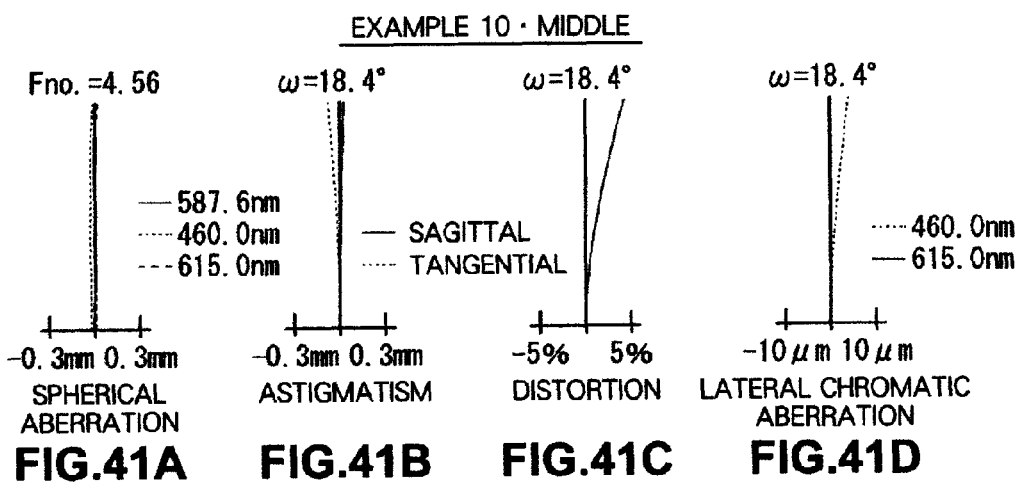
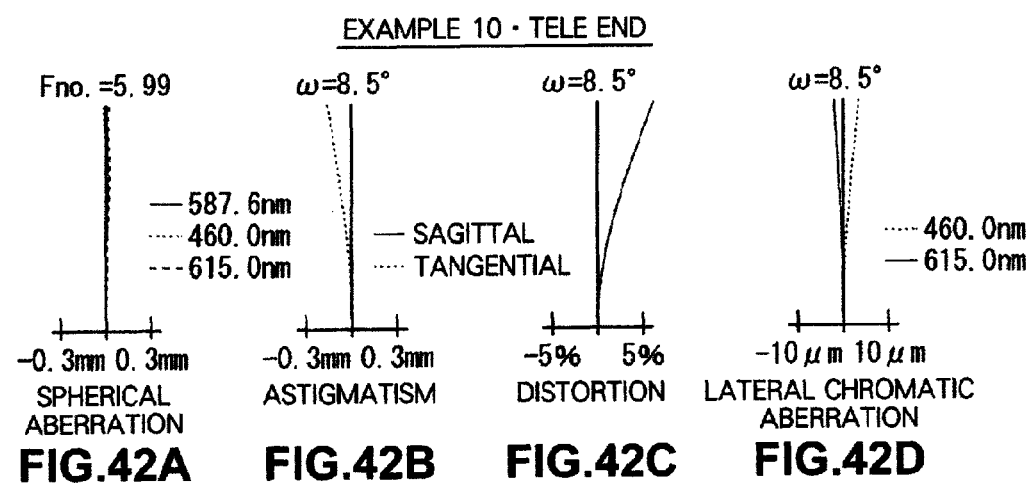

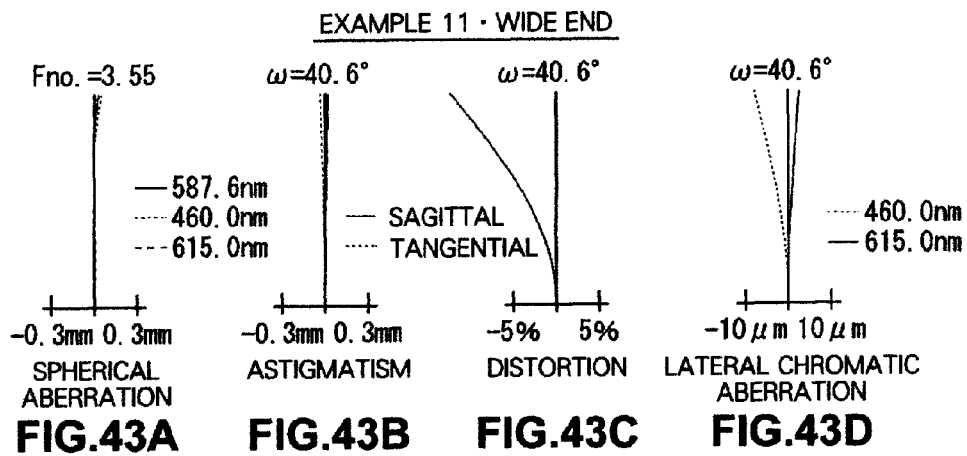
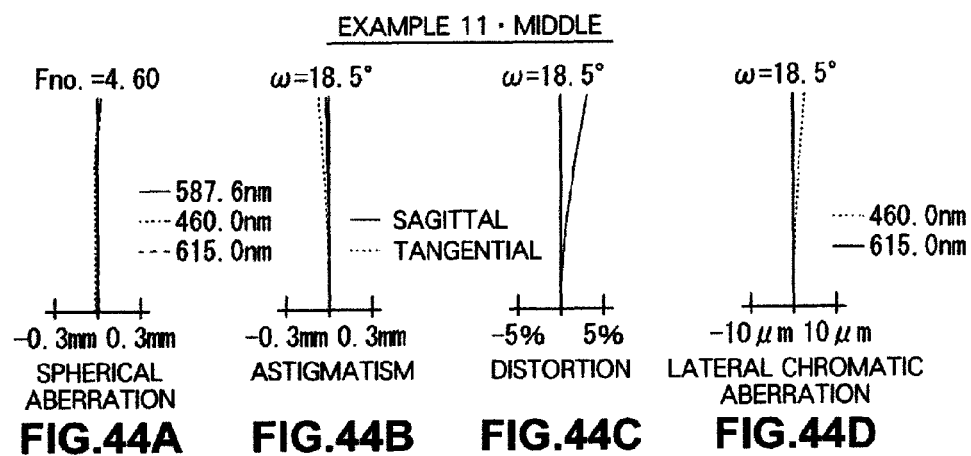
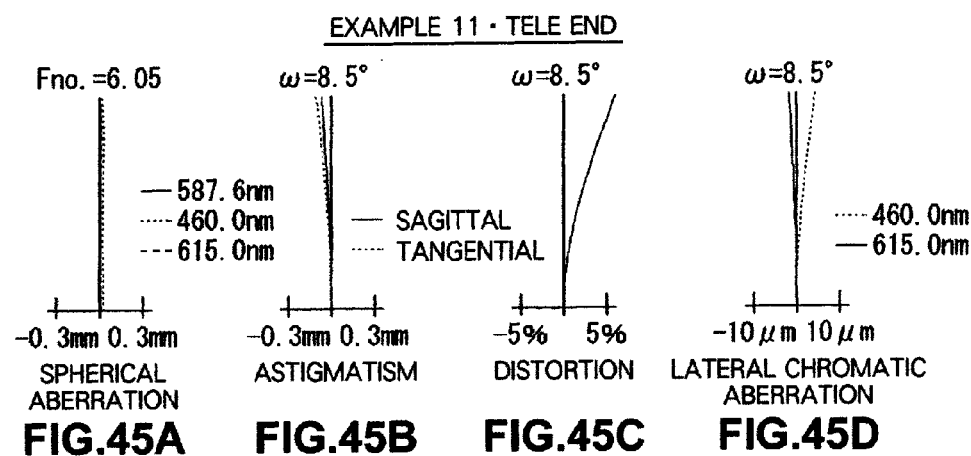

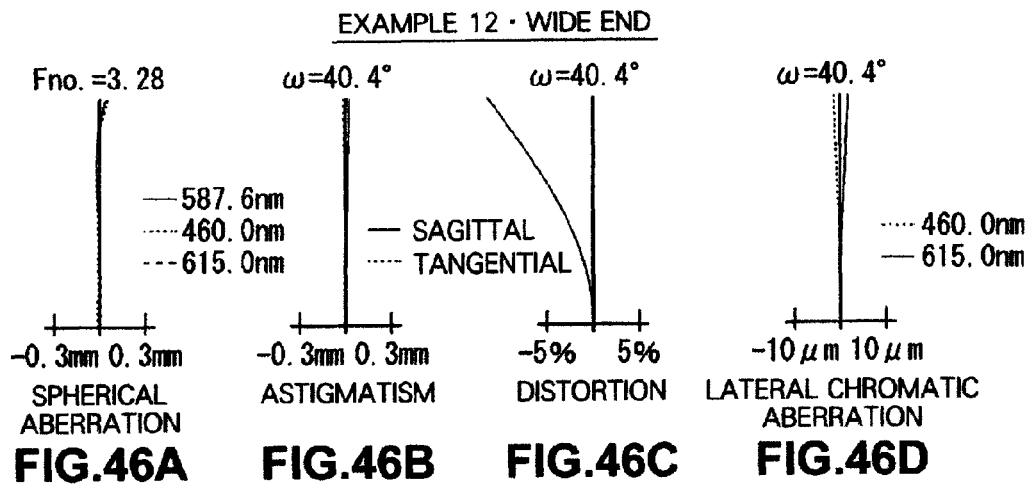
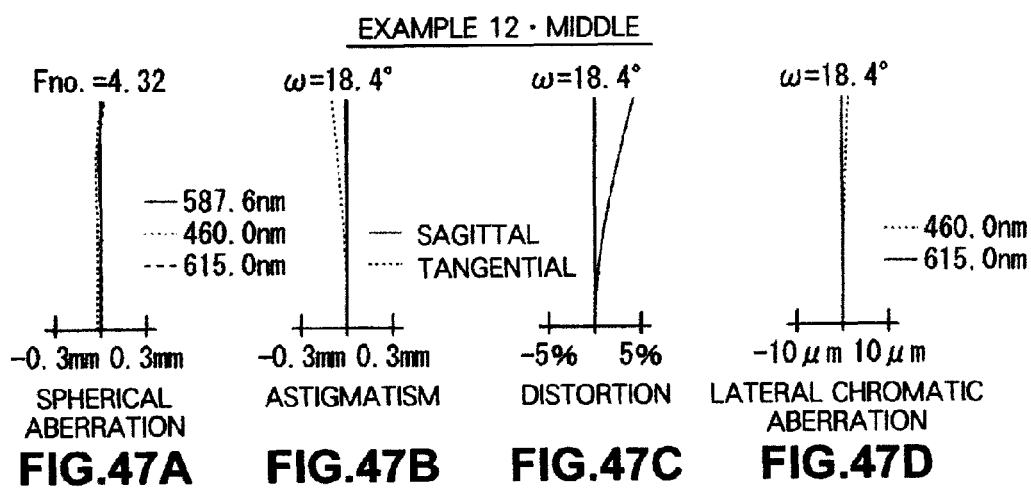
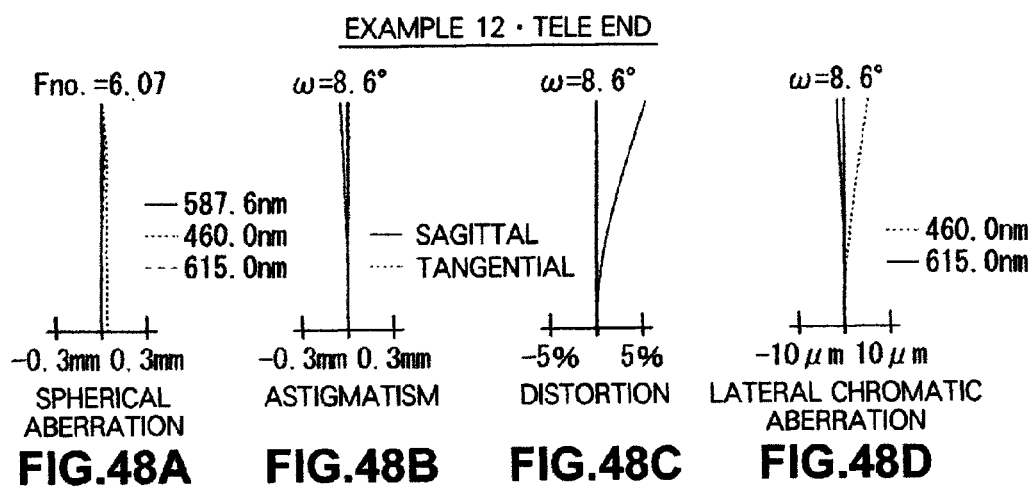

ZOOM LENS AND IMAGING APPARATUS

BACKGROUND OF THE INVENTION

1. Field of the Invention

The present invention relates to a zoom lens appropriate for a video camera, a digital still camera, a mobile information terminal (PDA: Personal Digital Assistance), and the like, and to an imaging apparatus.

2. Description of the Related Art

Imaging devices, such as a CCD (Charge Coupled Device) and a CMOS (Complementary Metal Oxide Semiconductor), used in imaging apparatuses, such as a digital still camera, became small in recent years. As the size of the imaging devices decreased, a demand for reducing the size of the whole imaging apparatus increased. To reduce the size of the whole imaging apparatus, it is desirable that the entire length of the lens is short and the lens system as a whole is small. In this case, it is desirable to structure the lens, considering not only the entire length of the lens during use (photography) but also the entire length of the lens in a stored non-use state (non-photography state). For example, it is desirable that the lens is structured in such a manner to be appropriate for a collapsible lens, which collapses into a camera body in non-photography state.

U.S. Pat. No. 6,975,461 (Patent Document 1), Japanese Unexamined Patent Publication No: 2005-326743 (Patent Document 2), and Japanese Unexamined Patent Publication No. 2008-310223 (Patent Document 3) disclose inventions related to four-group zoom lenses. The four-group zoom lens is composed of four lens groups having positive refractive power, negative refractive power, positive refractive power, and positive refractive power, which are sequentially arranged from the object side of the zoom lens.

The zoom lens disclosed in Patent Document 1 has a relatively high zooming magnification ratio of about five times, and the number of lenses is relatively small. However, the angle of view is about 60 degrees, which is not sufficiently wide. Further, since the power of each group is small, the amount of movement of each group is large, and it is difficult to reduce the size of the whole lens system.

Meanwhile, the zoom lens disclosed in Patent Document 2 has a relatively high zooming magnification ratio of about five times, and the angle of view is relatively wide. However, the amount of movement of the first lens group is large, and the length of the whole lens system at tele end is long. Therefore, it is difficult to reduce the size of the lens unit in a collapsed state.

Further, the zoom lens disclosed in Patent Document 3 has excellent compactness, because the number of lenses is small, and each lens group is thin. However, the angle of view is not sufficiently wide.

SUMMARY OF THE INVENTION

In view of the foregoing circumstances, it is an object of the present invention to provide a compact high-performance zoom lens that has a relatively wide angle of view and a high variable magnification ratio, and the aberration fluctuation of which during changing magnification is small. Further, it is another object of the present invention to provide an imaging apparatus including the zoom lens.

A zoom lens of the present invention is a zoom lens comprising:

a first lens group having positive refractive power;
a second lens group having negative refractive power;
a third lens group having positive refractive power; and
a fourth lens group having positive refractive power, which are sequentially arranged from the object side of the zoom lens, wherein the magnification of the zoom lens is changed from wide end to tele end by moving each of at least one of the lens groups in such a manner that a distance between the first lens group and the second lens group increases and that a distance between the second lens group and the third lens group decreases, and wherein the first lens group is composed of a negative lens and a positive lens, and wherein when the magnification of the zoom lens is changed from wide end to tele end, the first lens group moves toward the object side, the second lens group moves along a path convex toward the image side of the zoom lens, the third lens group monotonously moves only toward the object side, and the fourth lens group moves along a path convex toward the object side, and wherein the following formulas are satisfied:

$$0.3 < X1/ft < 0.5 \quad (1); \text{ and}$$

$$5.0 < f1/fw < 7.0 \quad (2), \text{ where}$$

X1: the amount of movement of the first lens group when the magnification is changed from wide end to tele end, ft: the focal length of the entire system of the zoom lens at tele end, f1: a combined focal length of the first lens group, and fw: the focal length of the entire system of the zoom lens at wide end.

In the zoom lens of the present invention, the movement path of each lens group during changing magnification is optimized. Further, the amount of movement of the first lens group during changing magnification and the structure of the first lens group are optimized. Accordingly, it is possible to easily suppress aberration fluctuation during changing magnification, while the zoom lens has a relatively wide angle of view and a high variable magnification ratio. Further, it is possible to easily keep the entire length of the lens system short, and to easily reduce the size of the whole lens system.

Further, when desirable structure as described below is appropriately adopted, it is possible to easily achieve even higher performance.

Further, in the zoom lens of the present invention, it is desirable that at least one of the following formulas is satisfied:

$$-1.4 < f2/fw < -1.2 \quad (3);$$

$$0.6 < \beta2t \cdot \beta3w/(\beta2w \cdot \beta3t) < 1.2 \quad (4); \text{ and}$$

$$0.70 < IH/fw < 0.85 \quad (5), \text{ where}$$

f2: a combined focal length of the second lens group, $\beta2w$: the lateral magnification ratio of the second lens group at wide end, $\beta2t$: the lateral magnification ratio of the second lens group at tele end, $\beta3w$: the lateral magnification ratio of the third lens group at wide end, $\beta3t$: the lateral magnification ratio of the third lens group at tele end, and IH: maximum image height.

Further, it is desirable that the first lens group is a cemented lens composed of the negative lens and the positive lens, cemented together. With respect to the first lens group, it is desirable that the following formulas are further satisfied:

$$v1n < 20.0 \quad (6); \text{ and}$$

$$24 < v1p - v1n < 35 \quad (7), \text{ where}$$

ν1n: the Abbe number of the negative lens in the first lens group for d-line, and ν1p: the Abbe number of the positive lens in the first lens group for d-line.

Further, it is desirable that the second lens group is composed of two negative lenses and a positive lens, which are sequentially arranged from the object side of the zoom lens.

Further, it is desirable that the third lens group is composed of a cemented lens of a positive lens and a first negative lens, and a second negative lens, which are sequentially arranged from the object side of the zoom lens. With respect to the third lens group, it is more desirable that the following formulas are further satisfied:

$$\nu 3n<20.0 \quad (8); \text{ and}$$

$$37<\nu 3p-\nu 3n<45 \quad (9), \text{ where}$$

ν3n: the Abbe number of the first negative lens constituting the cemented lens in the third lens group for d-line, and ν3p: the Abbe number of the positive lens constituting the cemented lens in the third lens group for d-line.

Further, it is desirable that at least a surface of the second negative lens in the third lens group is aspheric.

An imaging apparatus of the present invention is an imaging apparatus comprising:

a zoom lens of the present invention; and an imaging device that outputs an imaging signal based on an optical image formed by the zoom lens.

In the imaging apparatus of the present invention, the high-performance zoom lens of the present invention is used as an imaging lens, and the size of the imaging apparatus as a whole is reduced.

According to the zoom lens of the present invention, the movement path of each lens group during changing magnification is optimized in a four-group zoom lens. Further, the amount of movement of the first lens group during changing magnification and the structure of the first lens group are optimized. Therefore, it is possible to realize a compact high-performance zoom lens that has a relatively wide angle of view and a high variable magnification ratio, and the aberration fluctuation of which during changing magnification is small.

Further, since the imaging apparatus of the present invention uses, as an imaging lens, the high-performance zoom lens of the present invention, it is possible to reduce the size of the imaging apparatus as a whole, while excellent imaging performance with a wide angle of view and a high variable magnification ratio is maintained.

BRIEF DESCRIPTION OF THE DRAWINGS

FIG. 16A is a diagram illustrating spherical aberration of a zoom lens of Example 2 at wide end;

FIG. 16B is a diagram illustrating astigmatism of the zoom lens of Example 2 at wide end;

FIG. 16C is a diagram illustrating distortion of the zoom lens of Example 2 at wide end;

FIG. 16D is a diagram illustrating lateral chromatic aberration of the zoom lens of Example 2 at wide end;

FIG. 17A is a diagram illustrating spherical aberration of the zoom lens of Example 2 in middle range;

FIG. 17B is a diagram illustrating astigmatism of the zoom lens of Example 2 in middle range;

FIG. 17C is a diagram illustrating distortion of the zoom lens of Example 2 in middle range;

FIG. 17D is a diagram illustrating lateral chromatic aberration of the zoom lens of Example 2 in middle range;

FIG. 18A is a diagram illustrating spherical aberration of the zoom lens of Example 2 at tele end;

FIG. 18B is a diagram illustrating astigmatism of the zoom lens of Example 2 at tele end;

FIG. 18C is a diagram illustrating distortion of the zoom lens of Example 2 at tele end;

FIG. 18D is a diagram illustrating lateral chromatic aberration of the zoom lens of Example 2 at tele end;

FIG. 19A is a diagram illustrating spherical aberration of a zoom lens of Example 3 at wide end;

FIG. 19B is a diagram illustrating astigmatism of the zoom lens of Example 3 at wide end;

FIG. 19C is a diagram illustrating distortion of the zoom lens of Example 3 at wide end;

FIG. 19D is a diagram illustrating lateral chromatic aberration of the zoom lens of Example 3 at wide end;

FIG. 20A is a diagram illustrating spherical aberration of the zoom lens of Example 3 in middle range;

FIG. 20B is a diagram illustrating astigmatism of the zoom lens of Example 3 in middle range;

FIG. 20C is a diagram illustrating distortion of the zoom lens of Example 3 in middle range;

FIG. 20D is a diagram illustrating lateral chromatic aberration of the zoom lens of Example 3 in middle range;

FIG. 21A is a diagram illustrating spherical aberration of the zoom lens of Example 3 at tele end;

FIG. 21B is a diagram illustrating astigmatism of the zoom lens of Example 3 at tele end;

FIG. 21C is a diagram illustrating distortion of the zoom lens of Example 3 at tele end;

FIG. 21D is a diagram illustrating lateral chromatic aberration of the zoom lens of Example 3 at tele end;

FIG. 22A is a diagram illustrating spherical aberration of a zoom lens of Example 4 at wide end;

FIG. 22B is a diagram illustrating astigmatism of the zoom lens of Example 4 at wide end;

FIG. 22C is a diagram illustrating distortion of the zoom lens of Example 4 at wide end;

FIG. 22D is a diagram illustrating lateral chromatic aberration of the zoom lens of Example 4 at wide end;

FIG. 23A is a diagram illustrating spherical aberration of the zoom lens of Example 4 in middle range;

FIG. 23B is a diagram illustrating astigmatism of the zoom lens of Example 4 in middle range;

FIG. 23C is a diagram illustrating distortion of the zoom lens of Example 4 in middle range;

FIG. 23D is a diagram illustrating lateral chromatic aberration of the zoom lens of Example 4 in middle range;

FIG. 24A is a diagram illustrating spherical aberration of the zoom lens of Example 4 at tele end;

FIG. 24B is a diagram illustrating astigmatism of the zoom lens of Example 4 at tele end;

FIG. 24C is a diagram illustrating distortion of the zoom lens of Example 4 at tele end;

FIG. 24D is a diagram illustrating lateral chromatic aberration of the zoom lens of Example 4 at tele end;

FIG. 25A is a diagram illustrating spherical aberration of a zoom lens of Example 5 at wide end;

FIG. 25B is a diagram illustrating astigmatism of the zoom lens of Example 5 at wide end;

FIG. 25C is a diagram illustrating distortion of the zoom lens of Example 5 at wide end;

FIG. 25D is a diagram illustrating lateral chromatic aberration of the zoom lens of Example 5 at wide end;

FIG. 26A is a diagram illustrating spherical aberration of the zoom lens of Example 5 in middle range;

FIG. 26B is a diagram illustrating astigmatism of the zoom lens of Example 5 in middle range;

FIG. 26C is a diagram illustrating distortion of the zoom lens of Example 5 in middle range;

FIG. 26D is a diagram illustrating lateral chromatic aberration of the zoom lens of Example 5 in middle range;

FIG. 27A is a diagram illustrating spherical aberration of the zoom lens of Example 5 at tele end;

FIG. 27B is a diagram illustrating astigmatism of the zoom lens of Example 5 at tele end;

FIG. 27C is a diagram illustrating distortion of the zoom lens of Example 5 at tele end;

FIG. 27D is a diagram illustrating lateral chromatic aberration of the zoom lens of Example 5 at tele end;

FIG. 28A is a diagram illustrating spherical aberration of a zoom lens of Example 6 at wide end;

FIG. 28B is a diagram illustrating astigmatism of the zoom lens of Example 6 at wide end;

FIG. 28C is a diagram illustrating distortion of the zoom lens of Example 6 at wide end;

FIG. 28D is a diagram illustrating lateral chromatic aberration of the zoom lens of Example 6 at wide end;

FIG. 29A is a diagram illustrating spherical aberration of the zoom lens of Example 6 in middle range;

FIG. 29B is a diagram illustrating astigmatism of the zoom lens of Example 6 in middle range;

FIG. 29C is a diagram illustrating distortion of the zoom lens of Example 6 in middle range;

FIG. 29D is a diagram illustrating lateral chromatic aberration of the zoom lens of Example 6 in middle range;

FIG. 30A is a diagram illustrating spherical aberration of the zoom lens of Example 6 at tele end;

FIG. 30B is a diagram illustrating astigmatism of the zoom lens of Example 6 at tele end;

FIG. 30C is a diagram illustrating distortion of the zoom lens of Example 6 at tele end;

FIG. 30D is a diagram illustrating lateral chromatic aberration of the zoom lens of Example 6 at tele end;

FIG. 31A is a diagram illustrating spherical aberration of a zoom lens of Example 7 at wide end;

FIG. 31B is a diagram illustrating astigmatism of the zoom lens of Example 7 at wide end;

FIG. 31C is a diagram illustrating distortion of the zoom lens of Example 7 at wide end;

FIG. 31D is a diagram illustrating lateral chromatic aberration of the zoom lens of Example 7 at wide end;

FIG. 32A is a diagram illustrating spherical aberration of the zoom lens of Example 7 in middle range;

FIG. 32B is a diagram illustrating astigmatism of the zoom lens of Example 7 in middle range;

FIG. 32C is a diagram illustrating distortion of the zoom lens of Example 7 in middle range;

FIG. 32D is a diagram illustrating lateral chromatic aberration of the zoom lens of Example 7 in middle range;

FIG. 33A is a diagram illustrating spherical aberration of the zoom lens of Example 7 at tele end;

FIG. 33B is a diagram illustrating astigmatism of the zoom lens of Example 7 at tele end;

FIG. 33C is a diagram illustrating distortion of the zoom lens of Example 7 at tele end;

FIG. 33D is a diagram illustrating lateral chromatic aberration of the zoom lens of Example 7 at tele end;

FIG. 34A is a diagram illustrating spherical aberration of a zoom lens of Example 8 at wide end;

FIG. 34B is a diagram illustrating astigmatism of the zoom lens of Example 8 at wide end;

FIG. 34C is a diagram illustrating distortion of the zoom lens of Example 8 at wide end;

FIG. 34D is a diagram illustrating lateral chromatic aberration of the zoom lens of Example 8 at wide end;

FIG. 35A is a diagram illustrating spherical aberration of the zoom lens of Example 8 in middle range;

FIG. 35B is a diagram illustrating astigmatism of the zoom lens of Example 8 in middle range;

FIG. 35C is a diagram illustrating distortion of the zoom lens of Example 8 in middle range;

FIG. 35D is a diagram illustrating lateral chromatic aberration of the zoom lens of Example 8 in middle range;

FIG. 36A is a diagram illustrating spherical aberration of the zoom lens of Example 8 at tele end;

FIG. 36B is a diagram illustrating astigmatism of the zoom lens of Example 8 at tele end;

FIG. 36C is a diagram illustrating distortion of the zoom lens of Example 8 at tele end;

FIG. 36D is a diagram illustrating lateral chromatic aberration of the zoom lens of Example 8 at tele end;

FIG. 37A is a diagram illustrating spherical aberration of a zoom lens of Example 9 at wide end;

FIG. 37B is a diagram illustrating astigmatism of the zoom lens of Example 9 at wide end;

FIG. 37C is a diagram illustrating distortion of the zoom lens of Example 9 at wide end;

FIG. 37D is a diagram illustrating lateral chromatic aberration of the zoom lens of Example 9 at wide end;

FIG. 38A is a diagram illustrating spherical aberration of the zoom lens of Example 9 in middle range;

FIG. 38B is a diagram illustrating astigmatism of the zoom lens of Example 9 in middle range;

FIG. 38C is a diagram illustrating distortion of the zoom lens of Example 9 in middle range;

FIG. 38D is a diagram illustrating lateral chromatic aberration of the zoom lens of Example 9 in middle range;

FIG. 39A is a diagram illustrating spherical aberration of the zoom lens of Example 9 at tele end;

FIG. 39B is a diagram illustrating astigmatism of the zoom lens of Example 9 at tele end;

FIG. 39C is a diagram illustrating distortion of the zoom lens of Example 9 at tele end;

FIG. 39D is a diagram illustrating lateral chromatic aberration of the zoom lens of Example 9 at tele end;

FIG. 40A is a diagram illustrating spherical aberration of a zoom lens of Example 10 at wide end;

FIG. 40B is a diagram illustrating astigmatism of the zoom lens of Example 10 at wide end;

FIG. 40C is a diagram illustrating distortion of the zoom lens of Example 10 at wide end;

FIG. 40D is a diagram illustrating lateral chromatic aberration of the zoom lens of Example 10 at wide end;

FIG. 41A is a diagram illustrating spherical aberration of the zoom lens of Example 10 in middle range;

FIG. 41B is a diagram illustrating astigmatism of the zoom lens of Example 10 in middle range;

FIG. 41C is a diagram illustrating distortion of the zoom lens of Example 10 in middle range;

FIG. 41D is a diagram illustrating lateral chromatic aberration of the zoom lens of Example 10 in middle range;

FIG. 42A is a diagram illustrating spherical aberration of the zoom lens of Example 10 at tele end;

FIG. 42B is a diagram illustrating astigmatism of the zoom lens of Example 10 at tele end;

FIG. 42C is a diagram illustrating distortion of the zoom lens of Example 10 at tele end;

Figure 49A:
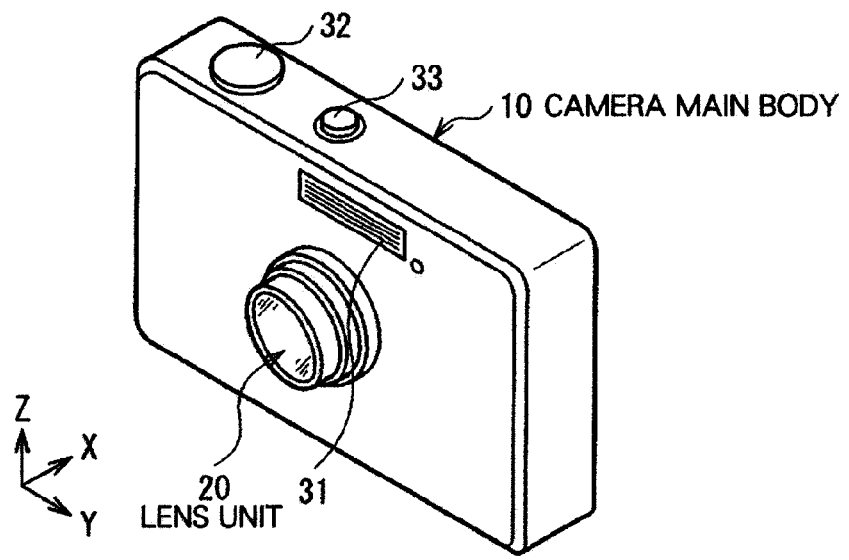
Figure 49B:
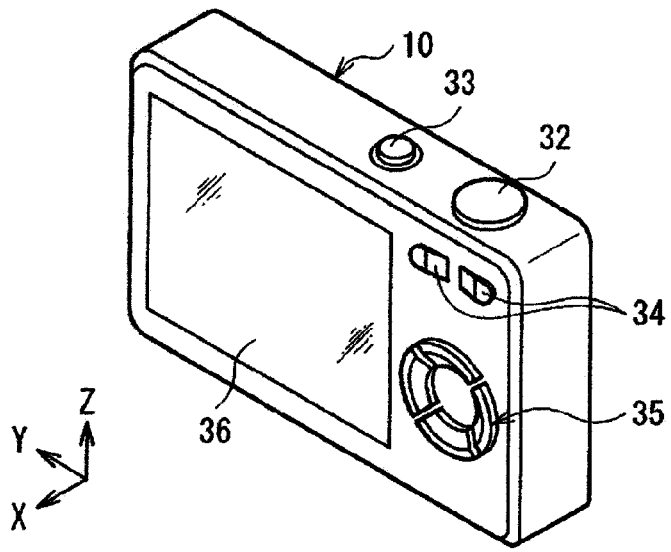
Figure 50:
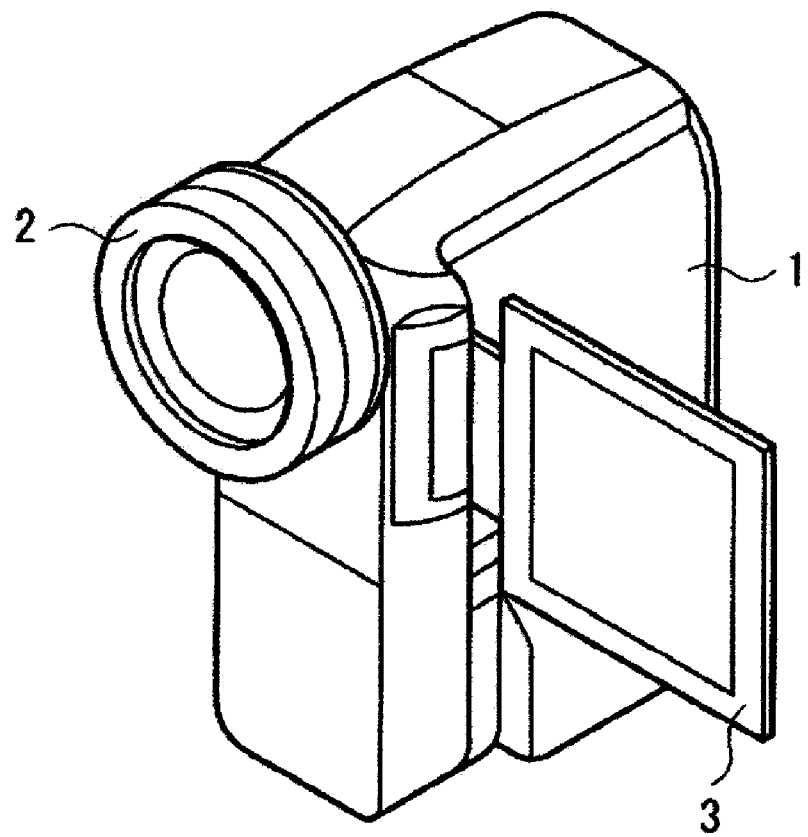

FIG. 42D is a diagram illustrating lateral chromatic aberration of the zoom lens of Example 10 at tele end;

FIG. 43A is a diagram illustrating spherical aberration of a zoom lens of Example 11 at wide end;

FIG. 43B is a diagram illustrating astigmatism of the zoom lens of Example 11 at wide end;

FIG. 43C is a diagram illustrating distortion of the zoom lens of Example 11 at wide end;

FIG. 43D is a diagram illustrating lateral chromatic aberration of the zoom lens of Example 11 at wide end;

FIG. 44A is a diagram illustrating spherical aberration of the zoom lens of Example 11 in middle range;

FIG. 44B is a diagram illustrating astigmatism of the zoom lens of Example 11 in middle range;

FIG. 44C is a diagram illustrating distortion of the zoom lens of Example 11 in middle range;

FIG. 44D is a diagram illustrating lateral chromatic aberration of the zoom lens of Example 11 in middle range;

FIG. 45A is a diagram illustrating spherical aberration of the zoom lens of Example 11 at tele end;

FIG. 45B is a diagram illustrating astigmatism of the zoom lens of Example 11 at tele end;

FIG. 45C is a diagram illustrating distortion of the zoom lens of Example 11 at tele end;

FIG. 45D is a diagram illustrating lateral chromatic aberration of the zoom lens of Example 11 at tele end;

FIG. 46A is a diagram illustrating spherical aberration of a zoom lens of Example 12 at wide end;

FIG. 46B is a diagram illustrating astigmatism of the zoom lens of Example 12 at wide end;

FIG. 46C is a diagram illustrating distortion of the zoom lens of Example 12 at wide end;

FIG. 46D is a diagram illustrating lateral chromatic aberration of the zoom lens of Example 12 at wide end;

FIG. 47A is a diagram illustrating spherical aberration of the zoom lens of Example 12 in middle range;

FIG. 47B is a diagram illustrating astigmatism of the zoom lens of Example 12 in middle range;

FIG. 47C is a diagram illustrating distortion of the zoom lens of Example 12 in middle range;

FIG. 47D is a diagram illustrating lateral chromatic aberration of the zoom lens of Example 12 in middle range;

FIG. 48A is a diagram illustrating spherical aberration of the zoom lens of Example 12 at tele end;

FIG. 48B is a diagram illustrating astigmatism of the zoom lens of Example 12 at tele end;

FIG. 48C is a diagram illustrating distortion of the zoom lens of Example 12 at tele end;

FIG. 48D is a diagram illustrating lateral chromatic aberration of the zoom lens of Example 12 at tele end;

FIG. 49A is an external view showing a structural example of a digital camera, as an imaging apparatus according to an embodiment of the present invention;

FIG. 49B is an external view showing a structural example of the digital camera, as an imaging apparatus according to an embodiment of the present invention; and FIG. 50 is an external view showing a structural example of a video camera, as an imaging apparatus according to an embodiment of the present invention.

DESCRIPTION OF THE PREFERRED EMBODIMENTS

[Lens Structure]

Hereinafter, embodiments of the present invention will be described with reference to drawings.

Figure 1:
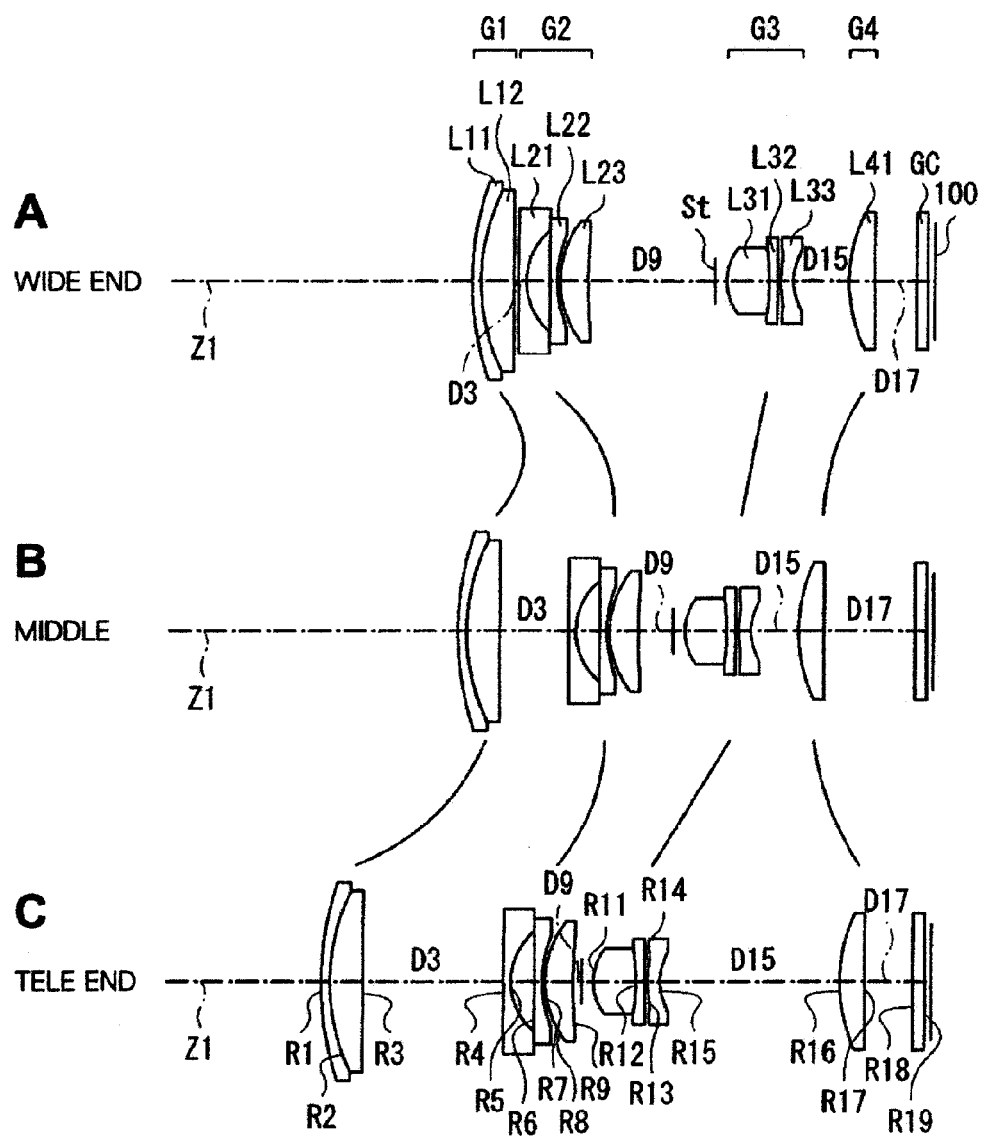
FIG. 1 is a cross sectional diagram illustrating a first structure example of a zoom lens according to an embodiment of the present invention, which corresponds to Numerical Example 1.

FIG. 1 is a diagram illustrating a first structure example of a zoom lens according to an embodiment of the present invention. This structure example corresponds to lens structure in Numerical Example 1, which will be described later. In FIG. 1, upper section A corresponds to the arrangement of an optical system at wide end (shortest focal length state), middle section B corresponds to the arrangement of the optical system in middle range (middle focal length state), and lower section C corresponds to the arrangement of the optical system at tele end (longest focal length state). Similarly, FIGS. 2 through 12 are diagrams illustrating cross sections of zoom lenses of the second through 12th structure examples, which correspond to Numerical Examples 2 through 12. In FIGS. 1 through 12, sign Ri represents the curvature radius of an i-th surface when an object-side surface of the most-object-side element is a first surface and the numbers of surfaces sequentially increase toward the image side (image plane side). Sign Di represents an interval between the i-th surface and (i+1)th surface on optical axis Z1. The sign Di is assigned only to surface intervals (for example, D3, D9, and the like) that change by changing the magnification of the zoom lens.

This zoom lens includes first lens group G1, second lens group G1, third lens group G3, and fourth lens group G4, which are sequentially arranged along optical axis Z1 from the object side. Optical aperture stop St is arranged between the second lens group G2 and the third lens group G3. The optical aperture stop St is arranged, for example, in the vicinity of the object side of the third lens group G3.

This zoom lens is mountable, for example, on photographic equipment, such as a video camera and a digital still camera, a mobile information terminal, such as a PDA, and the like. A member based on the structure of an imaging unit of a camera on which the zoom lens is mounted is arranged on the image side of the zoom lens. For example, an imaging device 100, such as a CCD (Charge Coupled Device) and a CMOS (Complementary Metal Oxide Semiconductor), is arranged on the image formation plane (imaging plane) of the zoom lens. The imaging device 100 outputs imaging signals based on an optical image formed by the zoom lens. An imaging apparatus according to an embodiment of the present invention includes at least the zoom lens and the imaging device 100. Various optical members GC based on the structure of the camera on which the lens is mounted may be arranged between the the last lens group (fourth lens group G4) and the imaging device 100. For example, a flat-plate-form optical member, such as a cover glass for protecting the imaging plane, an optical low-pass filter, and an infrared-ray-cut filter, may be arranged.

When the magnification of this zoom lens is changed from wide end to tele end, each of at least one of the lens groups is moved in such a manner that an interval between the first lens group G1 and the second lens group G2 increases and an interval between the second lens group G2 and the third lens group G3 decreases.

More specifically, when the magnification of the zoom lens is changed from wide end to middle range and further to tele end, each of at least one of the lens groups moves, for example, from a state illustrated in the upper section A of FIG. 1 to a state illustrated in the middle section B of FIG. 1 and further to a state illustrated in the lower section C of FIG. 1 in such a manner to draw paths indicated by solid lines in FIG. 1. As illustrated in FIG. 1, when the magnification of the zoom lens is changed from wide end to tele end, the first lens group G1 moves toward the object side. However, in the magnification range of changing from wide end to middle range, it is desirable that the first lens group G1 first moves to the image side, and then moves to the object side. When the magnification of the zoom lens is changed from wide end to tele end, the second lens group G2 moves along a path convex toward the image side of the zoom lens, and the third lens group G3 monotonously moves only toward the object side. The fourth lens group moves along a path convex toward the object side.

The aperture stop St moves, for example, together with the third lens group G3 (structure examples illustrated in FIGS. 1 through 8). Alternatively, as in structure examples illustrated in FIGS. 9 through 12, the aperture stop St may move independently from the lens groups.

The zoom lens maybe a collapsible lens. When the zoom lens is a collapsible lens, intervals between the lens groups on the optical axis Z1 may be reduced. Alternatively, a part of the lens groups (for example, the third lens group G3) may be removed from the optical axis Z1, and an interval or intervals between the remaining lens groups may be reduced.

The first lens group G1, as a whole, has positive refractive power. The first lens group G1 is composed of negative lens L11 and positive lens L12, which are sequentially arranged from the object side of the zoom lens. It is desirable that the negative lens L11 and the positive lens L12 are cemented together to form a cemented lens. The negative lens L11 is, for example, a negative meniscus lens having a convex surface facing the object side. The object side surface of the positive lens L12 is, for example, convex toward the object side.

The second lens group G2, as a whole, has negative refractive power. For example, the second lens group G2 is composed of two negative lenses L21, L22 and positive lens L23, which are sequentially arranged from the object side.

The third lens group G3, as a whole, has positive refractive power. For example, the third lens group G3 is composed of a cemented lens of positive lens L31 and first negative lens L32, and second negative lens L33, which are sequentially arranged from the object side. It is desirable that at least a surface of the most-image-side lens of the third lens group G3 (the second negative lens L33) is aspheric.

The fourth lens group G4, as a whole, has positive refractive power. It is desirable that the fourth lens group G4 consists of only positive lens L41. The positive lens L41 may include an aspheric surface or surfaces. However, it is desirable that both surfaces of the positive lens L41 are spherical to increase the eccentric sensitivity of the zoom lens.

It is desirable that the zoom lens is structured in such a manner to satisfy the following formulas appropriately and optionally:

$$0.3 < X1/ft < 0.5 \tag{1}$$

$$5.0 < f1/fw < 7.0 \tag{2}$$

$$-1.4 < f2/fw < -1.2 \tag{3}$$

$$0.6 < \beta 2t \cdot \beta 3w/(\beta 2w \cdot \beta 3t) < 1.2 \tag{4}$$

$$0.70 < IH/fw < 0.85 \tag{5}$$

$$v1n < 20.0 \tag{6}$$

$$24 < v1p - v1n < 35 \tag{7}$$

$$v3n < 20.0 \tag{8); and}$$

$$37 < v3p - v3n < 45 \tag{9), where}$$

X1: the amount of movement of the first lens group G1 when the magnification is changed from wide end to tele end, ft: the focal length of the entire system of the zoom lens at tele end, f1: a combined focal length of the first lens group G1, fw: the focal length of the entire system of the zoom lens at wide end, f2: a combined focal length of the second lens group G2, β2w: the lateral magnification ratio of the second lens group G2 at wide end, β2t: the lateral magnification ratio of the second lens group G2 at tele end, β3w: the lateral magnification ratio of the third lens group G3 at wide end, β3t: the lateral magnification ratio of the third lens group G3 at tele end, IH: maximum image height, ν1n: the Abbe number of the negative lens L11 in the first lens group G1 for d-line, ν1p: the Abbe number of the positive lens L12 in the first lens group G1 for d-line, ν3n: the Abbe number of the first negative lens L32 constituting the cemented lens in the third lens group G3 for d-line, and ν3p: the Abbe number of the positive lens L31 constituting the cemented lens in the third lens group G3 for d-line.

In the formula (1), X1 represents the amount of movement of the first lens group G1, which corresponds to the amount of change in the sum of surface intervals (D3+D9+D15+D17) that change when the magnification of the zoom lens is changed from wide end to tele end. Specifically, X1 is "Sum of Variable Surface Intervals (D3+D9+D15+D17) at Tele End"-"Sum of Variable Surface Intervals (D3+D9+D15+D17) at Wide End".

[Application to Imaging Apparatus]

FIGS. 49A and 49B are diagrams illustrating a digital still camera, as an example of an imaging apparatus according to an embodiment of the present invention. FIG. 49A shows an external view of the digital still camera from the front side, and FIG. 49B shows an external view of the digital still camera from the rear side. The digital still camera includes a camera body 10, and a strobe light output unit 31 is provided at an upper central position on the front side of the camera body 10. The strobe light output unit 31 outputs strobe light. Further, a release button 32 and a power source button 33 are provided on the upper side of the camera body 10. Further, a display unit 36 and operation units 34, 35 are provided on the rear side of the camera body 10. The display unit 36 is used to display an image obtained or to be obtained by imaging. Further, an aperture in photography is provided at a central part of the front side of the camera body 10, and light from a target of photography enters the digital still camera through the aperture. Further, a lens unit 20 is provided at a position corresponding to the aperture. In the lens unit 20, a lens element or elements are stored in a collapsible lens barrel. Further, an imaging device, such as a CCD, a signal processing circuit, a recording medium, and the like are provided in the camera body 10. The imaging device outputs imaging signals corresponding to a subject image formed by the lens unit 20. The signal processing circuit generates an image by processing the imaging signals output from the imaging device. The recording medium records the generated image. In the digital still camera, when the release button 32 is pressed, photography of a frame of still image is performed, and image data obtained by photography are stored in the recording medium (not illustrated) in the camera body 10. When the zoom lens according to an embodiment of the present invention is used as the lens unit 20 of the digital still camera, it is possible to obtain high-resolution imaging signals. Therefore, the camera body 10 side can generate high-resolution images based on the imaging signals.

Further, the digital still camera may have a function for obtaining a video image (motion image, moving image). A video image photography mode and a still image photography mode may be selected, for example, by operating the operation units 34, 35. When the video image photography mode is selected, video image data are obtained by continuously obtaining a plurality of still images per unit time.

FIG. 50 is a diagram illustrating a structure example of a video camera, as an example of an imaging apparatus on which the zoom lens of the present invention is mounted. The video camera includes a camera body 1 and an imaging lens 2, which is provided on the upper part of the camera body 1. Further, an imaging device, such as a CCD, a signal processing circuit, a recording medium, and the like are provided in the camera body 1. The imaging device outputs imaging signals corresponding to a subject image formed by the imaging lens 2. The signal processing circuit generates an image by processing the imaging signals output from the imaging device. The recording medium records the generated image. Further, a display unit 3 for displaying an image obtained or to be obtained by photography is provided on the camera body 1. The zoom lens according to an embodiment of the present invention may be adopted as the imaging lens 2 of the video camera.

[Action and Effect]

Next, the actions and effects of the zoom lens structured as described above will be described.

According to the zoom lens of the present invention, the movement path of each lens group during changing magnification is optimized in a four-group zoom lens, and the amount of movement of the first lens group G1 during changing magnification and the structure of the first lens group G1 are optimized. Therefore, it is possible to realize a compact high-performance zoom lens that has small aberration fluctuation during changing magnification, while the zoom lens has a relatively wide angle of view and a high variable magnification ratio.

Especially, since the first lens group G1 consists of two lenses of negative lens L11 and positive lens L12, it is possible to reduce the thickness of the first lens group G1. Meanwhile, it is necessary to reduce the entire length of the lens at wide end to reduce the diameter of the lens. However, when an excellent optical performance needs to be maintained also at tele end, if the movement path of the second lens group G2 is monotonous, it is difficult to achieve the excellent optical performance. In the zoom lens of the present invention, since the movement paths of the second lens group G2 and the fourth lens group G4 are special, it is possible to suppress fluctuation in the optical performance of the zoom lens in the entire zoom range, while structuring the entire lens system in small size.

Further, since the negative lens L11 and the positive lens L12 in the first lens group G1 are cemented together to form a cemented lens, it is possible to reduce an error (difference) generated during assembly of the zoom lens. Further, it is possible to reduce the thickness of the first lens group G1.

Since the second lens group G2 is composed of two negative lenses L21, L22 and positive lens L23, which are sequentially arranged from the object side, it is possible to reduce the size of the second lens group G2, and to correct curvature of field and chromatic aberrations in the entire range of variable magnification. Further, since the third lens group G3 is composed of a cemented lens of positive lens L31 and first negative lens L32, and second negative lens L33, which are sequentially arranged from the object side, it is possible to make the third lens group G3 thin. Further, since the most-image-side lens (second negative lens L33) in the third lens group G3 has an aspheric surface or surfaces, it is possible to suppress spherical aberrations and curvature of field in the entire range of variable magnification.

The formula (1) is related to the amount of movement of the first lens group G1 from wide end to tele end. When the formula (1) is satisfied, it is possible to reduce the size of the lens system. When the value of X1/ft is lower than the lower limit defined by the formula (1), the amount of movement of the first lens group G1 becomes small. Therefore, the length of a movement mechanism of the first lens group G1 becomes short. However, the entire lens length at wide end becomes long, and the diameter of the first lens group G1 becomes large. Hence, it becomes difficult to reduce the size of the lens system. Further, since the variable magnification action of the second lens group G2 is not sufficiently achieved, the variable magnification action of the third lens group G3 becomes large. Consequently, it becomes impossible to excellently correct aberrations. When the value of X1/ft exceeds the upper limit defined by the formula (1), the amount of movement of the first lens group G1 becomes large. Therefore, the length of a movement mechanism of the first lens group G1 becomes long. Hence, it is impossible to reduce the size of the lens system in a collapsed state.

Optionally, it is desirable that the numerical ranges of the formula (1) are as follows to achieve high optical performance in a smaller zoom lens:

$$0.32<X1/ft<0.48 \quad (1').$$

Further, it is more desirable that the numerical ranges of the formula (1) are as follows to achieve even higher optical performance:

$$0.35<X1/ft<0.46 \quad (1'').$$

The formula (2) is related the focal length of the first lens group G1. When the formula (2) is satisfied, it is possible to reduce the size of the optical system, and to excellently correct aberrations in the entire range of variable magnification. When the value of f1/fw is lower than the lower limit defined by the formula (2), the refractive power of the first lens group G1 becomes strong, and that is advantageous to reduce the size of the optical system. However, aberrations generated in the first lens group G1 increase. Hence, it becomes difficult to excellently correct aberrations in the entire zoom range. When the value of f1/fw exceeds the upper limit defined by the formula (2), the refractive power of the first lens group G1 becomes weak. Therefore, the entire lens length becomes long, and the diameter of the first lens group G1 increases. Hence, it is impossible to reduce the size of the optical system.

Optionally, it is desirable that the numerical ranges of the formula (2) are as follows to achieve high optical performance in a smaller zoom lens:

$$5.2 \leq f1/fw<6.5 \quad (2').$$

Further, it is more desirable that the numerical ranges of the formula (2) areas follows to achieve higher optical performance:

$$5.3 \leq f1/fw<6.0 \quad (2'').$$

The formula (3) is related to the focal length of the second lens group G2. When the formula (3) is satisfied, it is possible to reduce the size of the lens system. When the value of f2/fw is lower than the lower limit defined by the formula (3), the focal length of the second lens group G2 increases, and the refractive power of the second lens group G2 becomes weak. Therefore, it becomes difficult to obtain sufficient variable magnification action. If the amount of movement of the second lens group G2 is increased to obtain sufficient variable magnification action, the lens barrel becomes long, and it becomes difficult to reduce the diameter of the lens. When the value of f2/fw exceeds the upper limit defined by the formula (3), the refractive power of the second lens group G2 becomes strong. Therefore, aberration fluctuation in the entire zoom lens increases, and it becomes difficult to achieve excellent optical performance.

Optionally, it is desirable that the numerical ranges of the formula (3) are as follows to achieve high optical performance in a smaller zoom lens:

$$-1.38 \leq f2/fw<-1.2 \quad (3').$$

Further, it is more desirable that the numerical ranges of the formula (3) are as follows to achieve higher optical performance:

$$-1.36 \leq f2/fw<-1.21 \quad (3'').$$

The formula (4) is related to the ratio of the variable magnification action of the second lens group G2 and the variable magnification action of the third lens group G3. When the formula (4) is satisfied, it is possible to distribute main variable magnification actions to the second lens group G2 and the third lens group G3 in an optimum manner. When a desirable cam form is realized, it is possible to reduce the size of the lens barrel. When the value of $\beta 2t \cdot \beta 3w/(\beta 2w \cdot \beta 3t)$ is lower than the lower limit defined by the formula (4), the role of the third lens group G3 in variable magnification increases, and the amount of movement of the third lens group G3 increases, and that is disadvantageous to reduce the size of the lens system. Further, as the amount of movement increases, fluctuation of the exit pupil during changing magnification increases, and that is not desirable. When the value of $\beta 2t \cdot \beta 3w/(\beta 2w \cdot \beta 3t)$ exceeds the upper limit defined by the formula (4), the role of the second lens group G2 in variable magnification increases, and the amount of movement of the second lens group G2 increases, and that is disadvantageous to reduce the size of the lens system. Further, it becomes difficult to correct aberrations in the entire zoom range.

Optionally, it is desirable that the numerical ranges of the formula (4) are as follows to achieve high optical performance in a smaller zoom lens:

$$0.65<\beta 2t \cdot \beta 3w/(\beta 2w \cdot \beta 3t)<1.16 \quad (4').$$

Further, it is more desirable that the numerical ranges of the formula (4) are as follows to achieve higher optical performance:

$$0.77<\beta 2t \cdot \beta 3w/(\beta 2w \cdot \beta 3t)<1.12 \quad (4'').$$

The formula (5) is related to the maximum angle of view at wide end. When the formula (5) is satisfied, it is possible to perform photography even in wide angle of view. In the formula (5), IH represents the maximum image height, which corresponds to the effective size of the imaging device 100. In other words, when the formula (5) is satisfied, the zoom lens is applicable to an imaging apparatus including the imaging device 100 having effective size IH.

Optionally, it is desirable that the numerical ranges of the formula (5) are as follows:

$$0.72<IH/fw<0.83 \quad (5').$$

Further, it is more desirable that the numerical ranges of the formula (5) are as follows:

$$0.74<IH/fw<0.81 \quad (5'').$$

The formulas (6) and (7) are related to lens material of the first lens group G1. When the formulas (6) and (7) are satisfied, it is possible to sufficiently correct chromatic aberrations generated in the first lens group G1. When the value of $v1p-v1n$ exceeds the upper limit defined by the formula (7), an expensive low-dispersion material is used as the material of the positive lens L12, and the cost of the material is disadvantageous. Further, since the refractive index is low, the lens needs to have high curvature. When the value of ν1p-ν1n is lower than the lower limit defined by the formula (7), it is impossible to sufficiently correct longitudinal chromatic aberration and lateral chromatic aberration.

The formulas (8) and (9) are related to the lens material of the cemented lens in the third lens group G3. When the formulas (8) and (9) are satisfied, it is possible to sufficiently correct chromatic aberrations generated in the third lens group G3. When the value of ν3p-ν3n exceeds the upper limit defined by the formula (9), an expensive low-dispersion material needs to be used as the material of the positive lens L31, and the cost of the material is disadvantageous. Further, since the refractive index is low, it is inevitable that the lens has high curvature, and it becomes difficult to balance correction of aberrations, such as spherical aberration, and that is disadvantageous. When the value of ν3p-ν3n is lower than the lower limit defined by the formula (9), it is impossible to sufficiently correct longitudinal chromatic aberration and lateral chromatic aberration.

EXAMPLES

Next, specific numerical examples of the zoom lens according to the embodiments of the present invention will be described. In the following descriptions, plural numerical examples will be described partially collectively.

Numerical Example 1

[Table 1] through [Table 3] show specific lens data corresponding to the structure of the zoom lens illustrated in FIG. 1. Specifically, [Table 1] shows basic lens data, and [Table 2] and [Table 3] show other data. In the lens data of [Table 1], the column of surface number Si shows the surface number of i-th surface (i=1 through 19) of the zoom lens of Example 1, when the object-side surface of the most-object-side element is the first surface, and surface numbers sequentially increase toward the image side. The column of curvature radius Ri shows the value (mm) of the curvature radius of the i-th surface, sequentially from the object side. The curvature radius Ri in [Table 1] corresponds to sign Ri in FIG. 1. Similarly, the column of surface interval Di shows an interval (mm) between the i-th surface Si and the (i+1) th surface Si+1 on the optical axis, sequentially from the object side. The column Ndj shows the refractive index of j-th optical element from the object side for d-line (587.6 nm). Further, the column νdj shows the Abbe number of the j-th optical element from the object side for d-line.

In the zoom lens of Example 1, intervals between the lens groups change when the magnification of the zoom lens is changed. Therefore, the values of surface intervals D3, D9, D15, and D17 on the front or rear side of the moving lens groups are variable. [Table 2] shows, as zoom data, data of the surface intervals D3, D9, D15, and D17 at wide end, at middle, and at tele end during changing magnification. Further, [Table 2] shows various data, such as paraxial focal length f (mm) of the entire system, angle of view (2ω), and F-number (Fno.) at wide end, at middle and at tele end.

In the lens data of [Table 1], sign "*" is provided on the left side of a surface number to indicate that the lens surface is aspheric. In the zoom lens of Example 1, both surfaces S14, S15 of the most-image-side lens (second negative lens L33) in the third lens group G3 are aspheric. In the basic lens data of [Table 1], curvature radii in the vicinity of the optical axis (paraxial curvature radii) are shown as the curvature radii of aspheric surfaces.

[Table 3] shows aspheric data about the zoom lens of Example 1. In the numerical values of the aspheric data, sign "E" represents that the number following the sign "E" is the exponent when the base is 10, and that the numerical value before the sign "E" is multiplied by the numerical value represented by the exponential function using 10 as the base. For example, "1.0E-02" means "$1.0 \times 10^{-2}$".

The aspheric data of the lens data of Example 1 show values of coefficients $A_n$, K in the following aspheric equation (A):

$$Z = C \cdot h^2 / \{1 + (1 - K \cdot C^2 \cdot h^2)^{1/2}\} + \Sigma A_n \cdot h^n \quad \text{(A), and}$$

(n=integer greater than or equal to 3), where

Z: depth of aspheric surface (mm), h: distance (height) from optical axis to lens surface (mm), K: eccentricity, C: paraxial curvature=1/R (R: paraxial curvature radius), and $A_n$: n-th order aspheric coefficient.

More specifically, Z is the length (mm) of a perpendicular from a point on an aspheric surface at height h from the optical axis, to a plane (plane perpendicular to the optical axis) in contact with the vertex of the aspheric surface.

The aspheric surfaces of the zoom lens of Example 1 are expressed based on the aspheric equation (A) by using, as aspheric coefficients $A_n$, aspheric coefficients $A_3$ through $A_{10}$ for the third through tenth orders.

TABLE 1

EXAMPLE 1 - BASIC LENS DATA

| | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G1 | 1 | 22.0877 | 0.63 | 1.94595 | 17.98 |
| | 2 | 14.9430 | 2.35 | 1.83481 | 42.71 |
| | 3 | ∞ | D3 | | |
| G2 | 4 | 292.8689 | 0.54 | 1.90366 | 31.32 |
| | 5 | 4.8200 | 1.68 | | |
| | 6 | ∞ | 0.51 | 1.83400 | 37.16 |
| | 7 | 8.7482 | 0.20 | | |
| | 8 | 7.0431 | 2.00 | 1.94595 | 17.98 |
| | 9 | 41.8545 | D9 | | |
| | 10 (STOP) | ∞ | 0.80 | | |
| G3 | 11 | 3.8430 | 3.01 | 1.60311 | 60.64 |
| | 12 | -16.0360 | 0.59 | 1.92286 | 18.90 |
| | 13 | ∞ | 0.20 | | |
| | *14 | 5.7045 | 0.89 | 1.60596 | 26.92 |
| | *15 | 3.4351 | D15 | | |

TABLE 1-continued

EXAMPLE 1 - BASIC LENS DATA

| | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G4 | 16 | 11.5943 | 1.82 | 1.58913 | 61.14 |
| | 17 | | D17 | | |
| | 18 | ∞ | 0.80 | 1.51680 | 64.20 |
| | 19 | ∞ | | | |

(*: ASPHERIC SURFACE)

TABLE 2

EXAMPLE 1 - ZOOM DATA

| | WIDE END | MIDDLE | TELE END |
|---|---|---|---|
| f | 5.15 | 11.14 | 24.11 |
| Fno. | 3.72 | 4.46 | 6.16 |
| 2ω | 83.0 | 38.5 | 18.0 |
| D3 | 0.300 | 4.831 | 9.943 |
| D9 | 9.023 | 2.503 | 0.601 |
| D15 | 3.942 | 3.338 | 12.658 |
| D17 | 3.427 | 6.910 | 3.909 |

TABLE 3

EXAMPLE 1 - ASPHERIC DATA

| COEFFICIENT | 14TH SURFACE | 15TH SURFACE |
|---|---|---|
| K | −1.48309896 | −1.24024416 |
| A3 | 3.58815557E−03 | 3.60195185E−03 |
| A4 | −1.86523615E−02 | −1.13481606E−02 |
| A5 | 1.57809864E−02 | 1.79315959E−02 |
| A6 | −1.20833516E−02 | −1.52817590E−02 |
| A7 | 2.00848774E−03 | 4.66269367E−03 |
| A8 | 2.24549843E−03 | 9.87875708E−04 |
| A9 | −1.45484897E−03 | −1.05009095E−03 |
| A10 | 2.63150745E−04 | 2.12482748E−04 |

Numerical Examples 2 through 12

Figure 2:
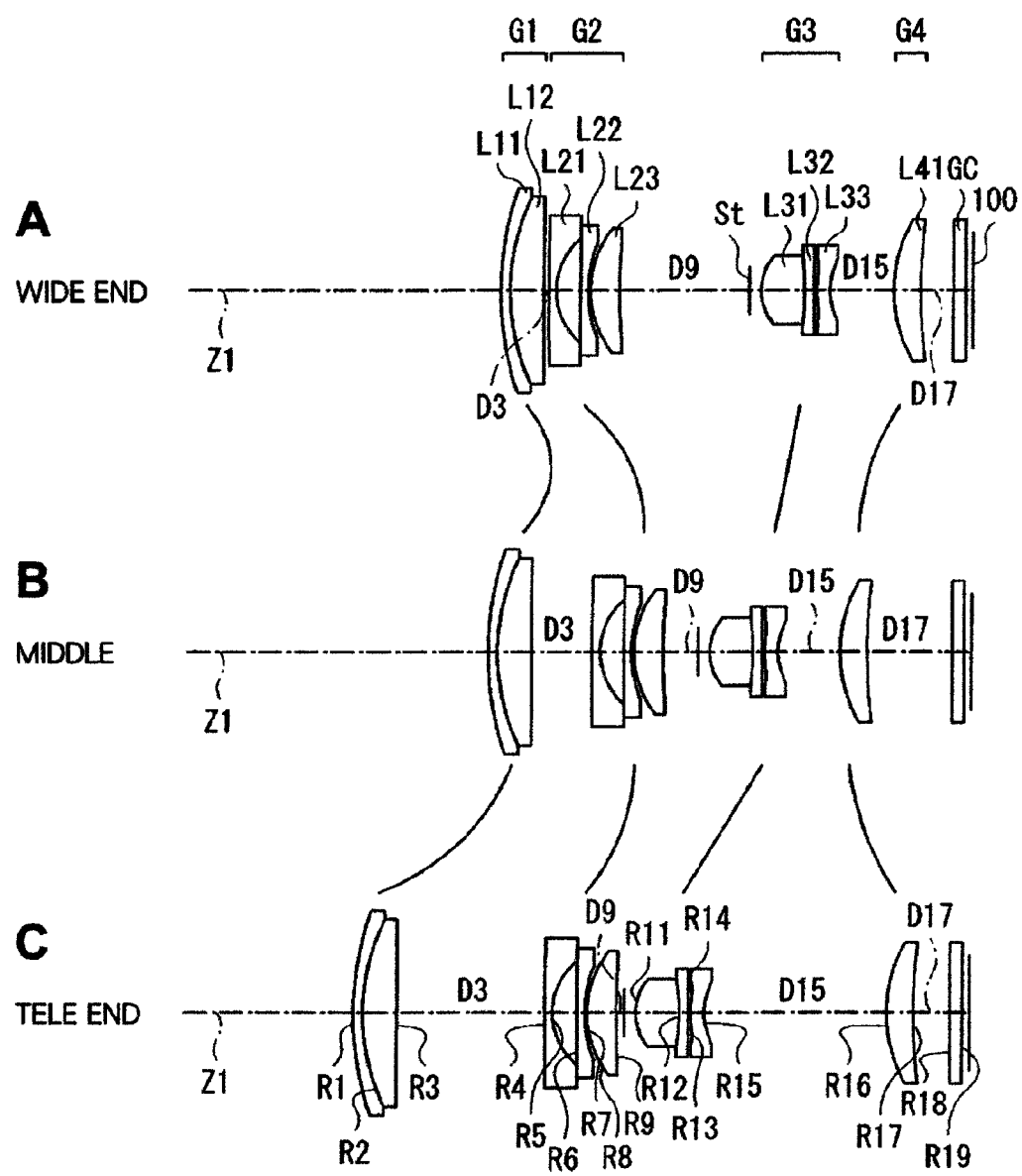
FIG. 2 is a cross sectional diagram illustrating a second structure example of a zoom lens, which corresponds to Numerical Example 2.
Figure 3:
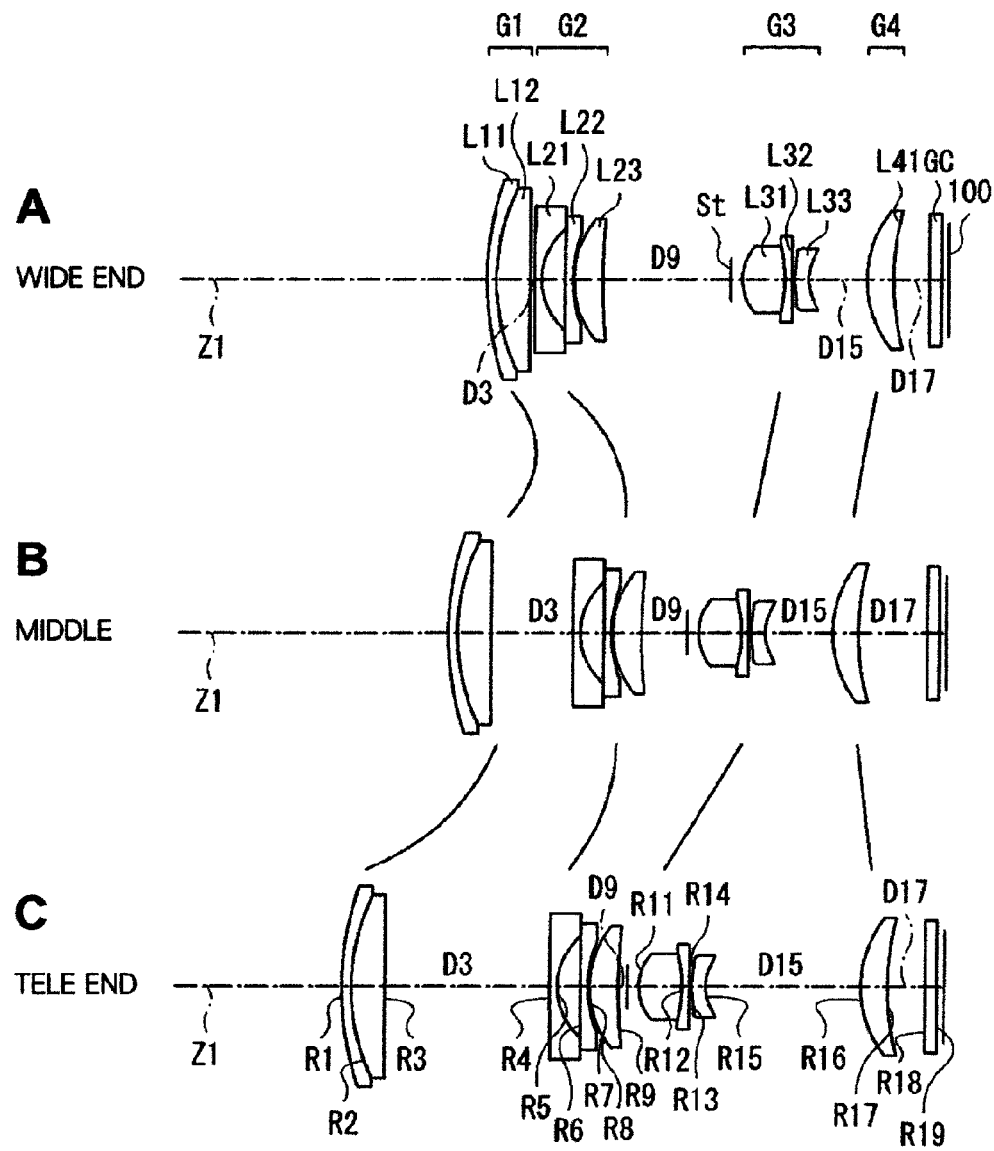
FIG. 3 is a cross sectional diagram illustrating a third structure example of a zoom lens, which corresponds to Numerical Example 3.
Figure 4:
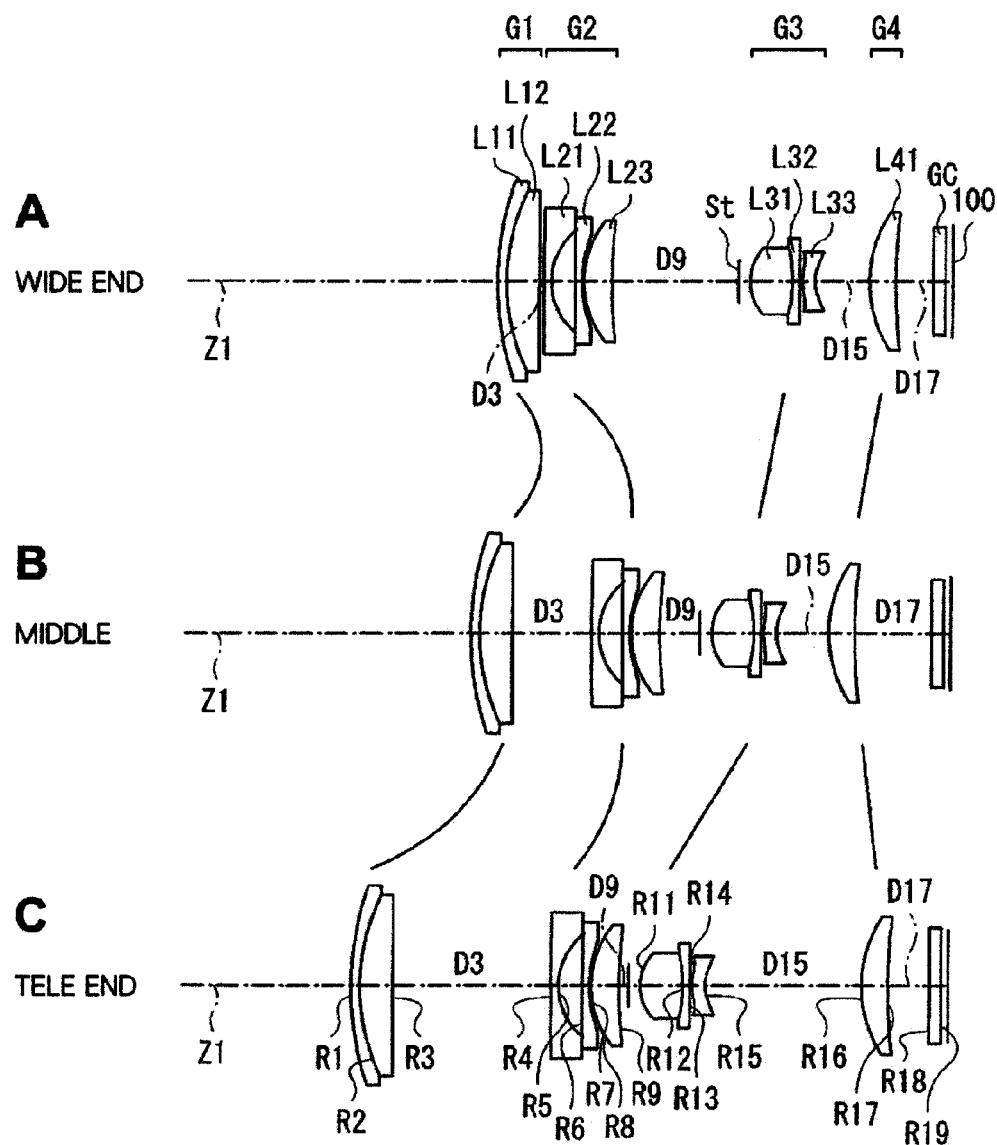
FIG. 4 is a cross sectional diagram illustrating a fourth structure example of a zoom lens, which corresponds to Numerical Example 4.
Figure 5:
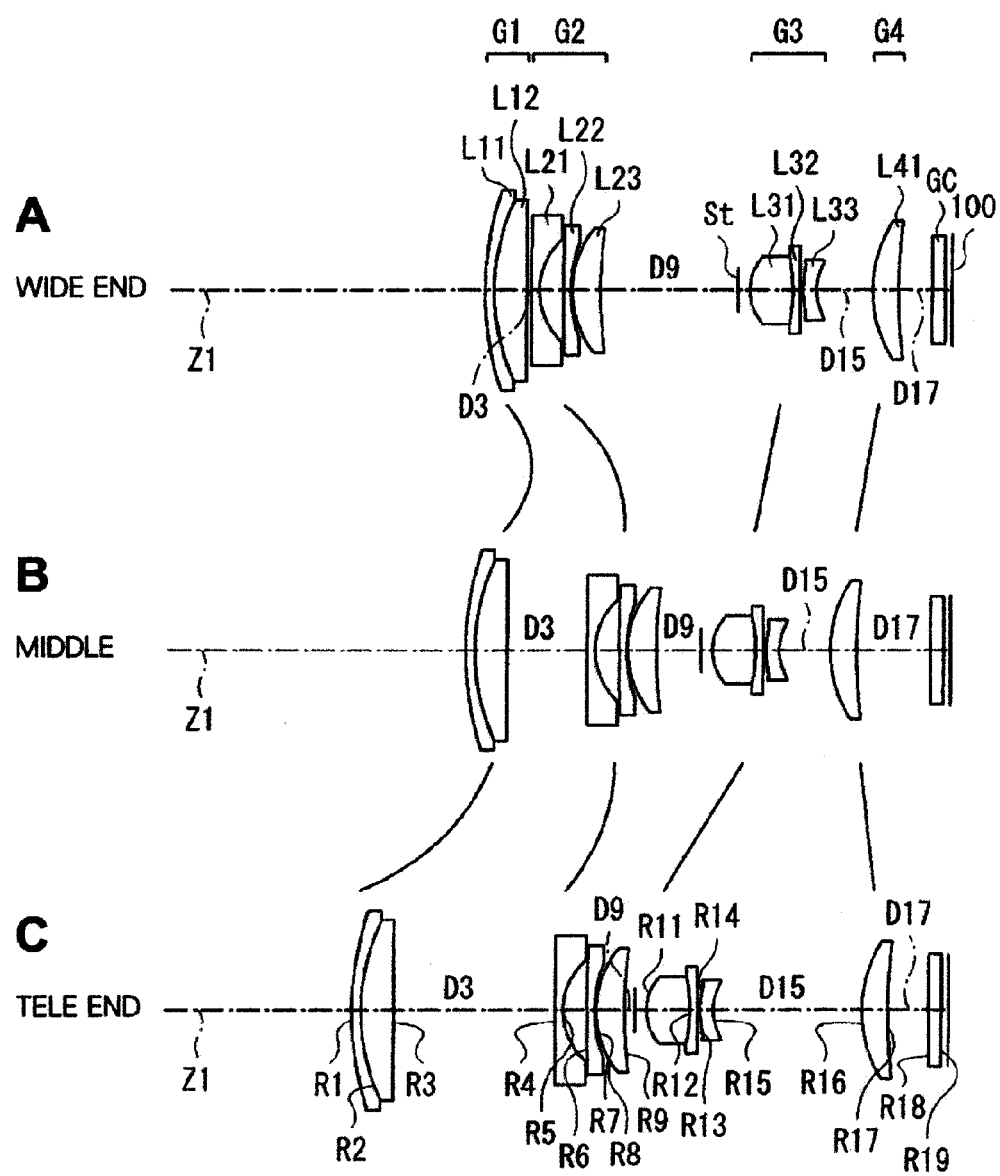
FIG. 5 is a cross sectional diagram illustrating a fifth structure example of a zoom lens, which corresponds to Numerical Example 5.
Figure 6:
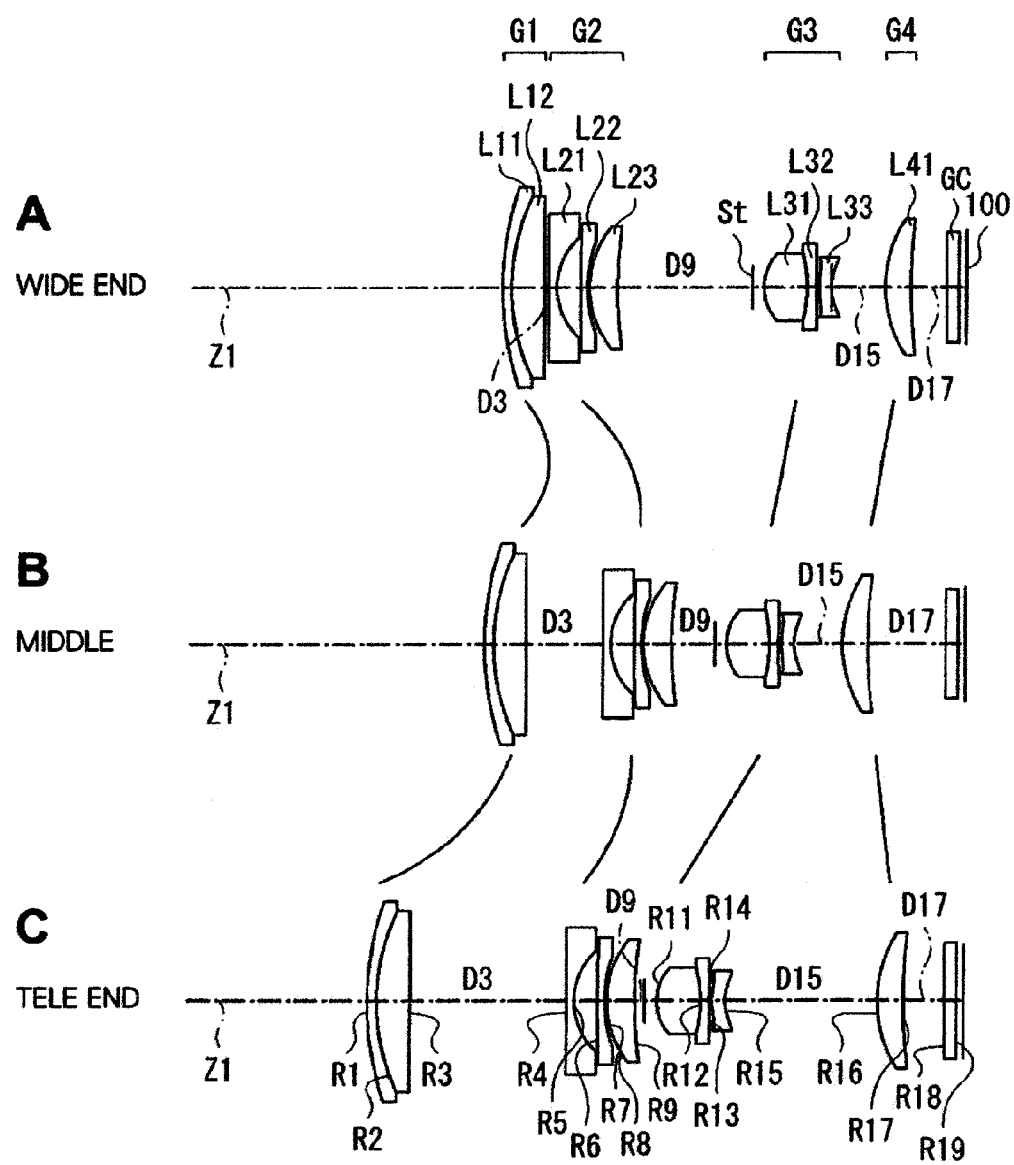
FIG. 6 is a cross sectional diagram illustrating a sixth structure example of a zoom lens, which corresponds to Numerical Example 6.
Figure 7:
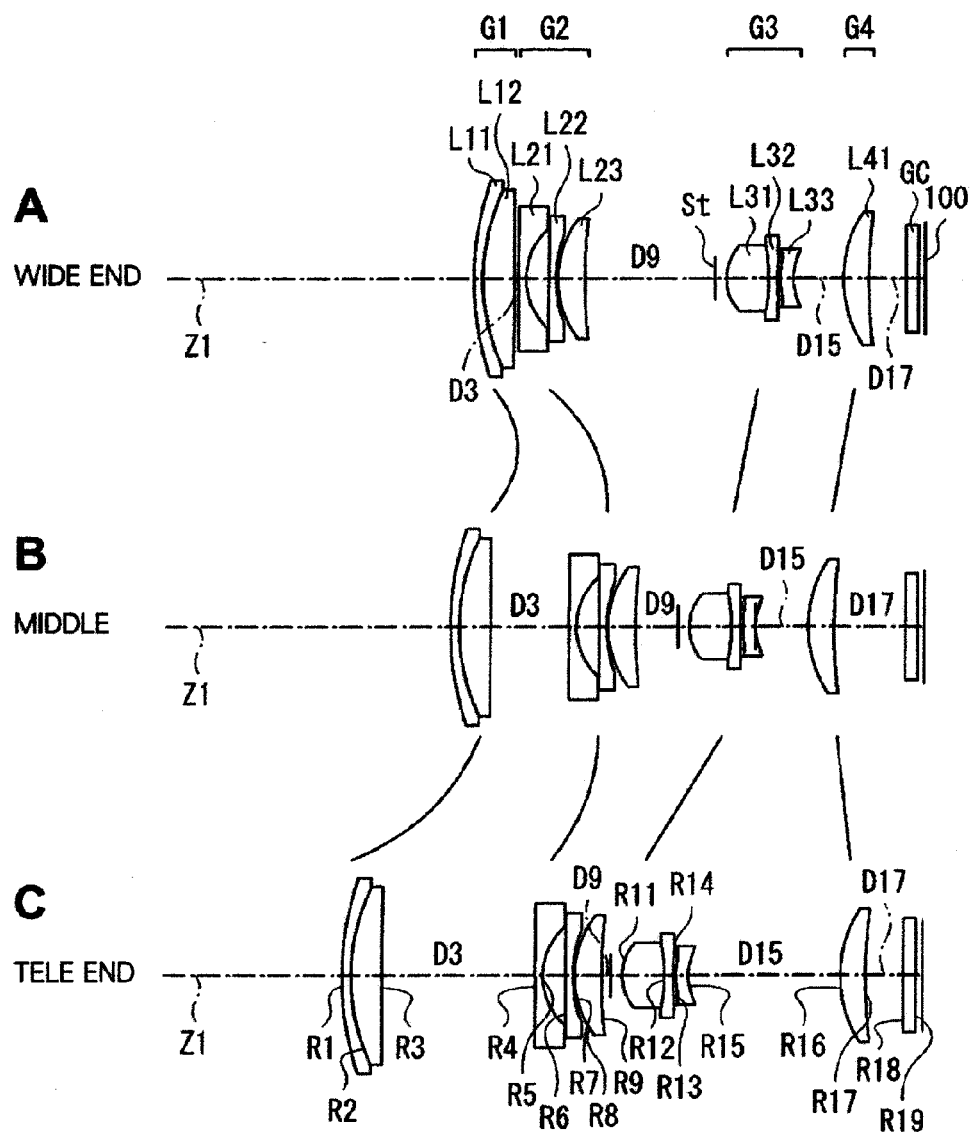
FIG. 7 is a cross sectional diagram illustrating a seventh structure example of a zoom lens, which corresponds to Numerical Example 7.
Figure 8:
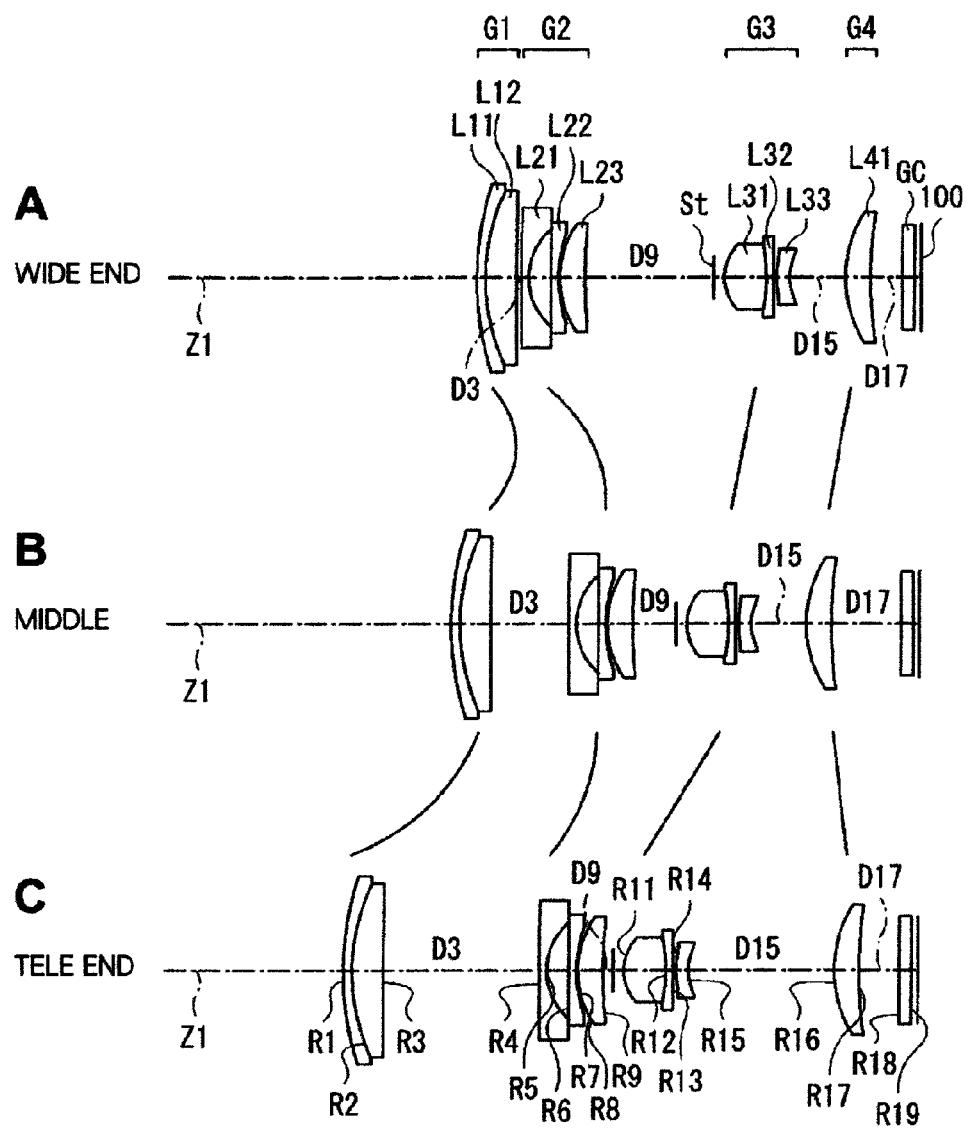
FIG. 8 is a cross sectional diagram illustrating an eighth structure example of a zoom lens, which corresponds to Numerical Example 8.
Figure 9:
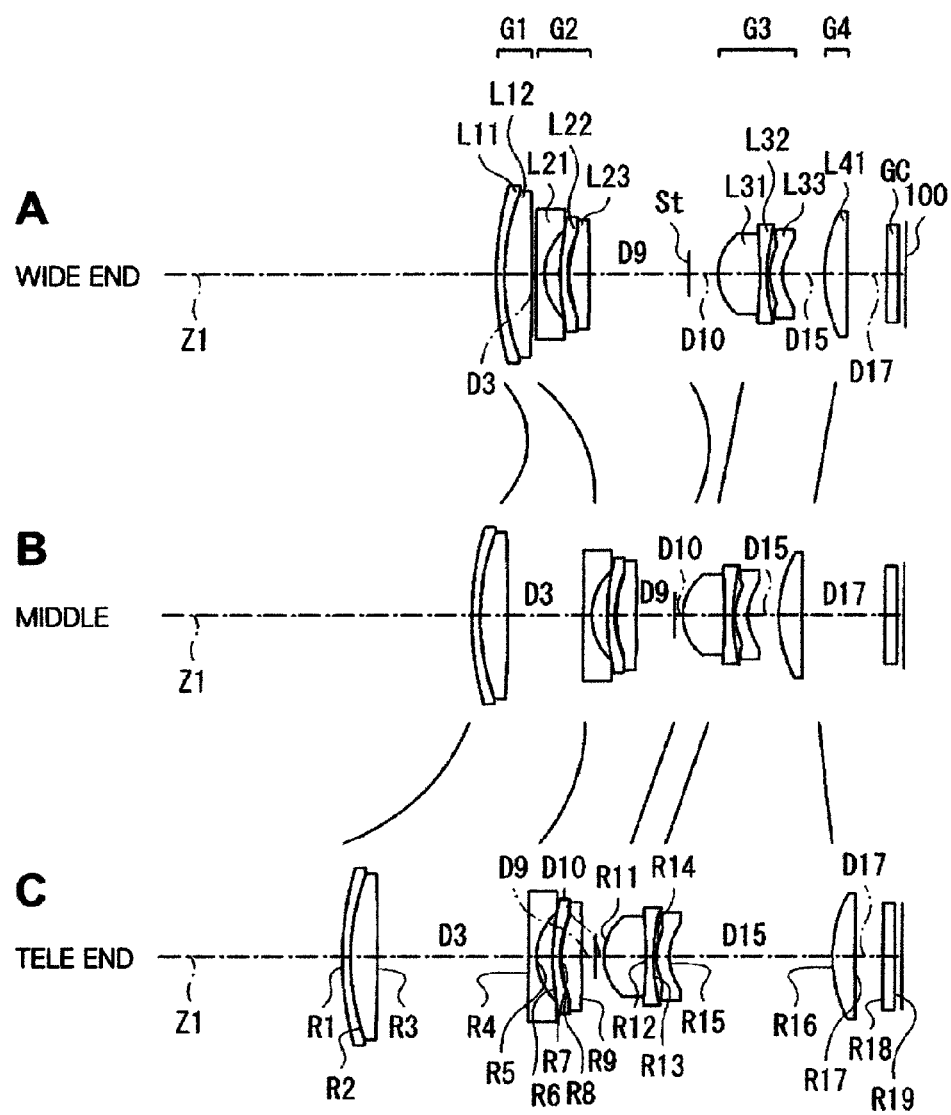
FIG. 9 is a cross sectional diagram illustrating a ninth structure example of a zoom lens, which corresponds to Numerical Example 9.
Figure 10:
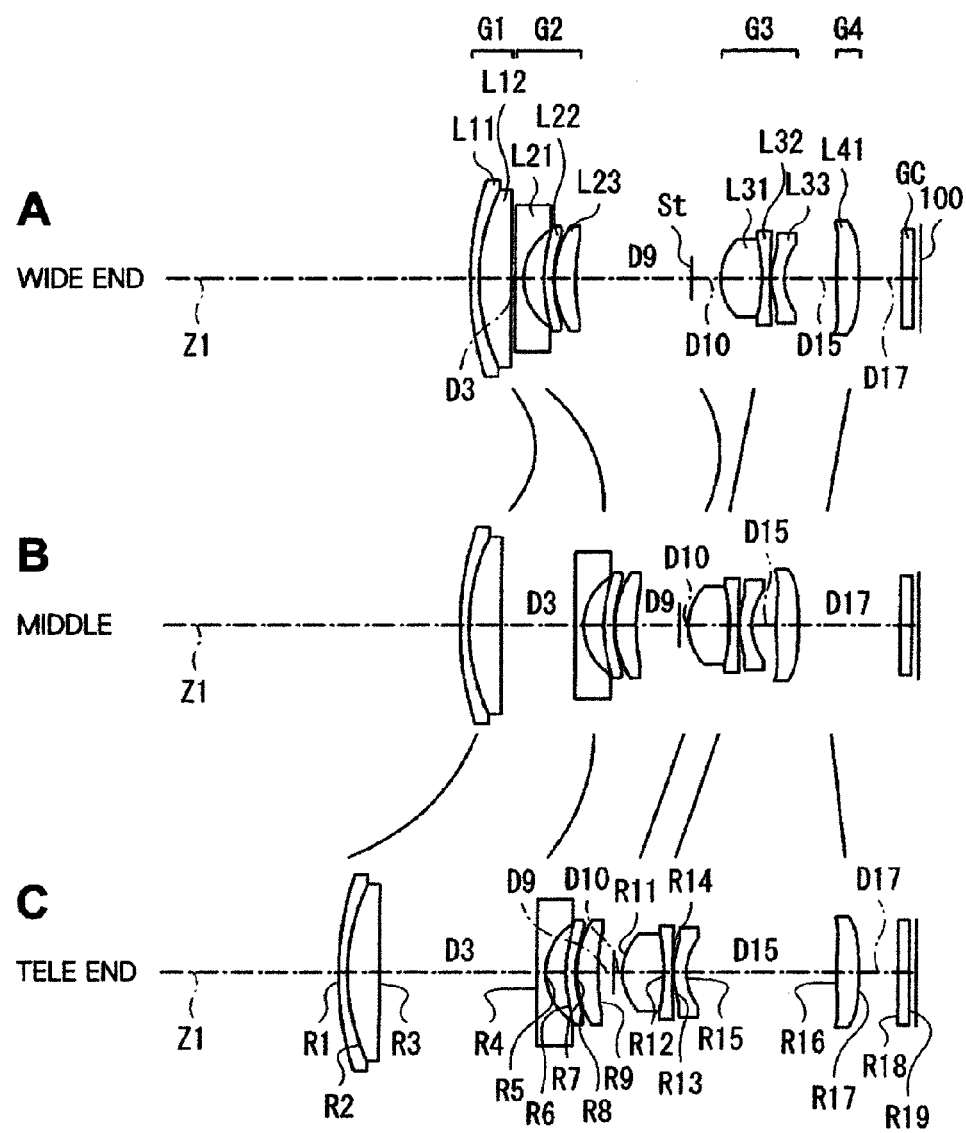
FIG. 10 is a cross sectional diagram illustrating a tenth structure example of a zoom lens, which corresponds to Numerical Example 10.
Figure 11:
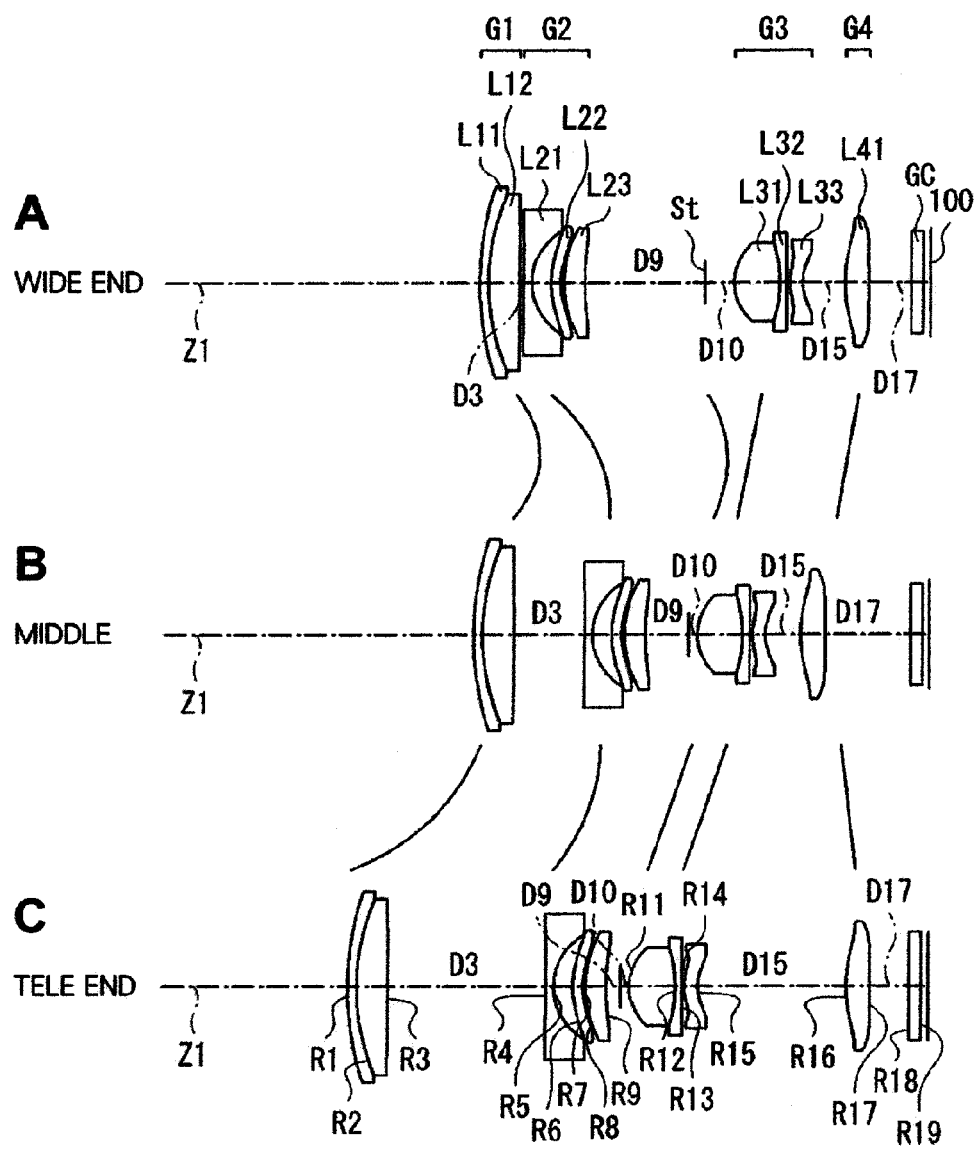
FIG. 11 is a cross sectional diagram illustrating an 11th structure example of a zoom lens, which corresponds to Numerical Example 11.
Figure 12:
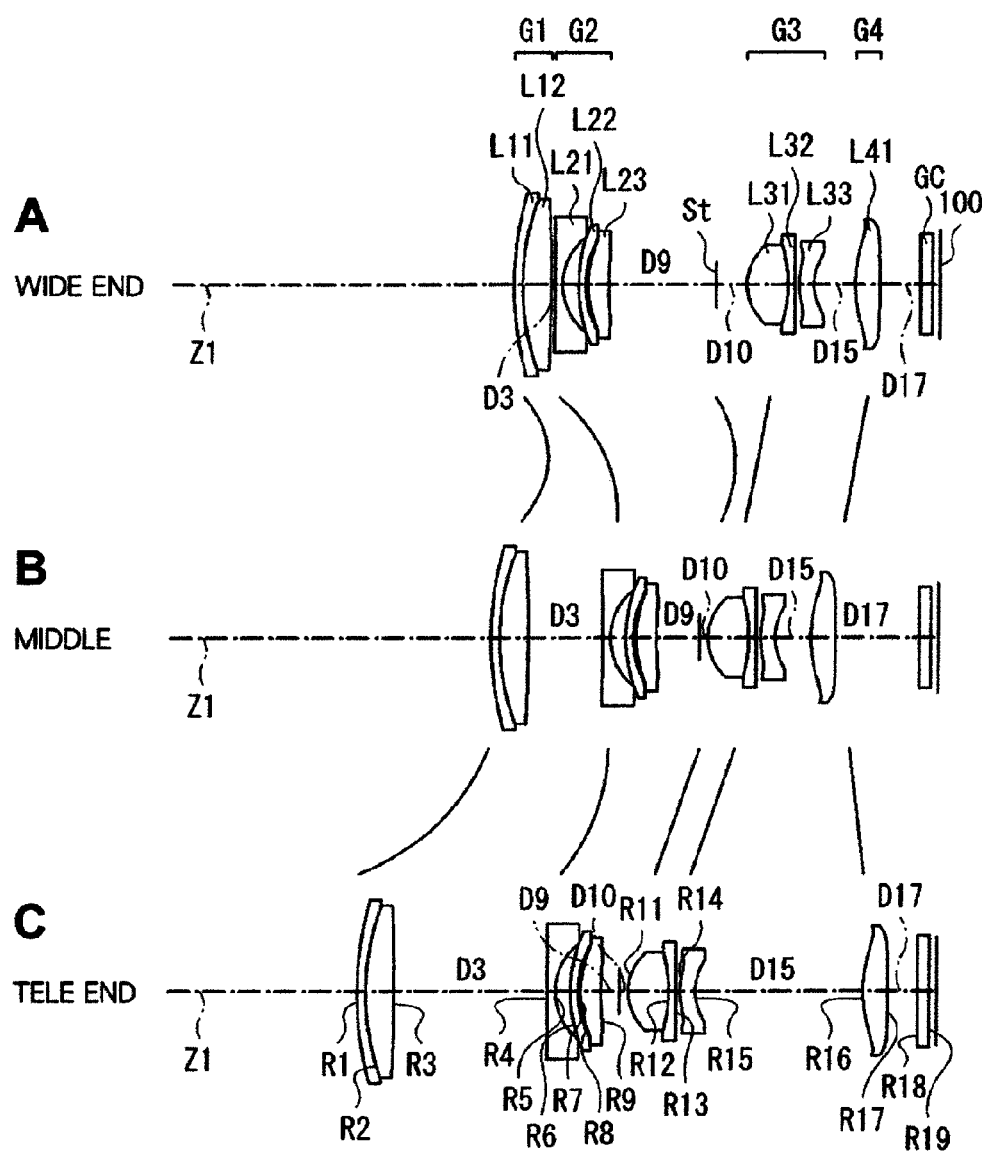
FIG. 12 is a cross sectional diagram illustrating a 12th structure example of a zoom lens, and which corresponds to Numerical Example 12.
Figures 13A, 13B, 13C, 13D:
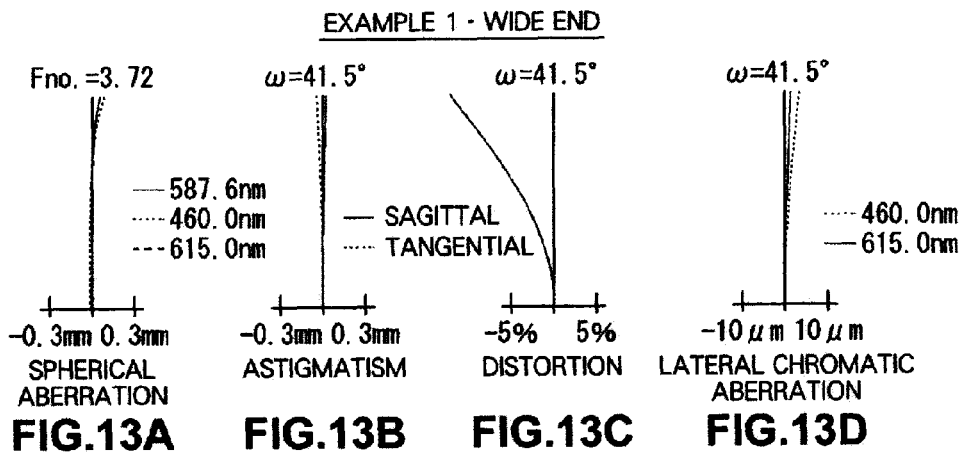
FIG. 13A is a diagram illustrating spherical aberration of a zoom lens of Example 1 at wide end.
FIG. 13B is a diagram illustrating astigmatism of the zoom lens of Example 1 at wide end.
FIG. 13C is a diagram illustrating distortion of the zoom lens of Example 1 at wide end.
FIG. 13D is a diagram illustrating lateral chromatic aberration of the zoom lens of Example 1 at wide end.
Figures 14A, 14B, 14C, 14D:
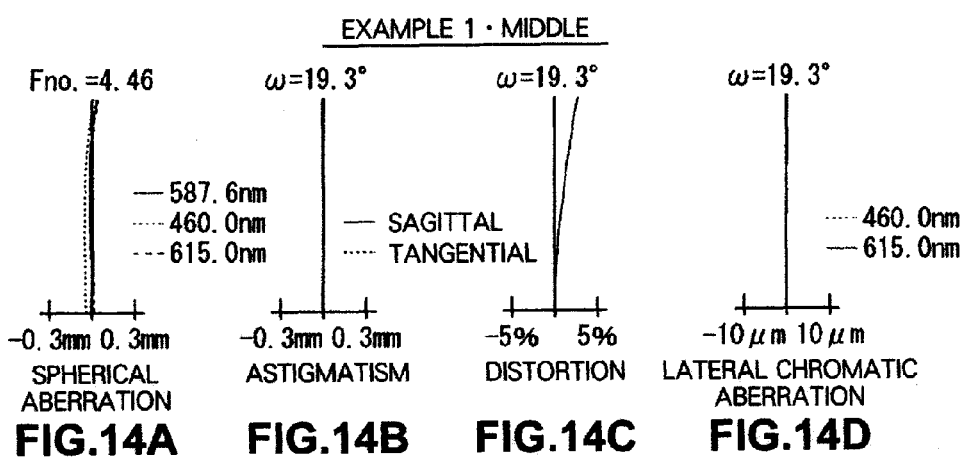
FIG. 14A is a diagram illustrating spherical aberration of the zoom lens of Example 1 in middle range.
FIG. 14B is a diagram illustrating astigmatism of the zoom lens of Example 1 in middle range.
FIG. 14C is a diagram illustrating distortion of the zoom lens of Example 1 in middle range.
FIG. 14D is a diagram illustrating lateral chromatic aberration of the zoom lens of Example 1 in middle range.
Figures 15A, 15B, 15C, 15D:
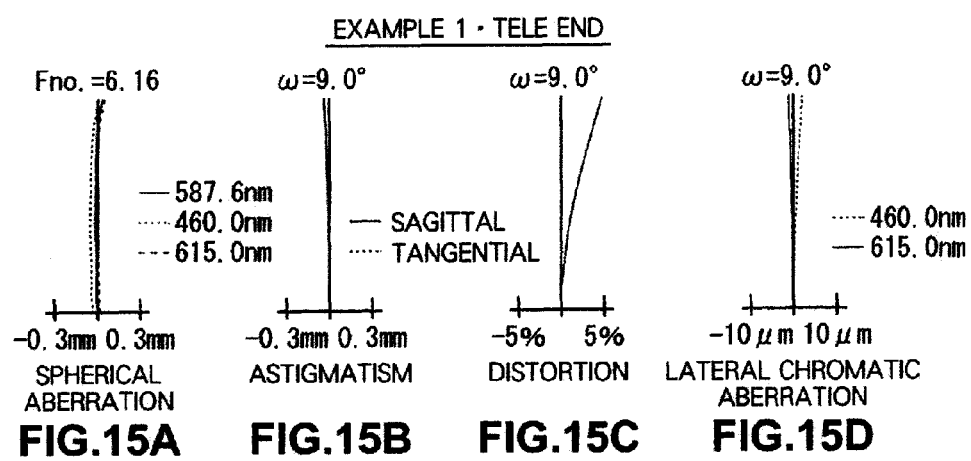
FIG. 15A is a diagram illustrating spherical aberration of the zoom lens of Example 1 at tele end.
FIG. 15B is a diagram illustrating astigmatism of the zoom lens of Example 1 at tele end.
FIG. 15C is a diagram illustrating distortion of the zoom lens of Example 1 at tele end.
FIG. 15D is a diagram illustrating lateral chromatic aberration of the zoom lens of Example 1 at tele end.

[Table 4] through [Table 6] show, as Numerical Example 2, specific lens data corresponding to the structure of the zoom lens illustrated in FIG. 2 in a manner similar to Numerical Example 1. Similarly, [Table 7] through [Table 36] show, as Numerical Examples 3 through 12, specific lens data corresponding to the structure of the zoom lenses illustrated in FIGS. 3 through 12.

In the zoom lenses of Numerical Examples 2 through 8, the same surfaces as the aspheric surfaces in the zoom lens of Numerical Example 1 are aspheric. Further, aperture stop St moves together with the lens group G3.

However, in the zoom lenses of Numerical Examples 9 through 12, the number of aspheric surfaces is larger than the number of the aspheric surfaces in the zoom lens of Numerical Example 1. For example, in the zoom lens of Numerical Example 9, both sides S8, S9 of the most-image-side lens (positive lens L23) in the second lens group G2 and the image side surface S17 of the positive lens L41 in the fourth lens group G4 are aspheric in addition to the most-image-side lens (second negative lens L33) in the third lens group G3. Further, in the zoom lenses of Numerical Examples 9 through 12, aperture stop St moves independently from the lens groups. Therefore, surface intervals D9, D10 on the front side and on the rear side of the aperture stop St are variable.

TABLE 4

EXAMPLE 2 - BASIC LENS DATA

| | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G1 | 1 | 22.1703 | 0.63 | 1.94595 | 17.98 |
| | 2 | 14.9504 | 2.37 | 1.83481 | 42.71 |
| | 3 | ∞ | D3 | | |
| G2 | 4 | 231.8394 | 0.54 | 1.90366 | 31.32 |
| | 5 | 4.7932 | 1.68 | | |
| | 6 | ∞ | 0.51 | 1.83400 | 37.16 |
| | 7 | 8.8781 | 0.17 | | |
| | 8 | 7.0183 | 2.00 | 1.94595 | 17.98 |
| | 9 | 40.0412 | D9 | | |
| | 10 (STOP) | ∞ | 0.80 | | |
| G3 | 11 | 3.6584 | 3.01 | 1.58913 | 61.14 |
| | 12 | −16.0421 | 0.60 | 1.92286 | 18.90 |
| | 13 | ∞ | 0.20 | | |
| | *14 | 6.2951 | 0.89 | 1.60596 | 26.92 |
| | *15 | 3.6430 | D15 | | |
| G4 | 16 | 10.0045 | 1.84 | 1.62299 | 58.16 |
| | 17 | 37.2256 | D17 | | |
| | 18 | ∞ | 0.85 | 1.51680 | 64.20 |
| | 19 | ∞ | | | |

(*: ASPHERIC SURFACE)

TABLE 5

EXAMPLE 2 - ZOOM DATA

|  | WIDE END | MIDDLE | TELE END |
|---|---|---|---|
| f | 5.17 | 11.23 | 24.39 |
| Fno. | 3.70 | 4.59 | 6.05 |
| 2ω | 82.5 | 38.9 | 17.7 |
| D3 | 0.300 | 4.174 | 10.192 |
| D9 | 8.999 | 2.421 | 0.557 |
| D15 | 4.423 | 4.247 | 12.523 |
| D17 | 2.733 | 6.347 | 3.029 |

TABLE 6

EXAMPLE 2 - ASPHERIC DATA

| COEFFICIENT | 14TH SURFACE | 15TH SURFACE |
|---|---|---|
| K | −5.55711029 | −1.67719074 |
| A3 | 4.01561133E−03 | 5.45958779E−03 |
| A4 | −1.66395500E−02 | −1.45360131E−02 |
| A5 | 1.07597038E−02 | 2.01745582E−02 |
| A6 | −7.05822762E−03 | −1.64797372E−02 |
| A7 | −5.83544908E−05 | 5.02068731E−03 |
| A8 | 1.77447515E−03 | 9.05267254E−04 |
| A9 | −8.62716167E−04 | −1.01933758E−03 |
| A10 | 1.38288874E−04 | 2.09619936E−04 |

TABLE 7

EXAMPLE 3 - BASIC LENS DATA

|  | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G1 | 1 | 22.3610 | 0.65 | 1.94595 | 17.98 |
| G1 | 2 | 14.9000 | 2.37 | 1.83481 | 42.71 |
| G1 | 3 | −76275.7647 | D3 | | |
| G2 | 4 | 211.3483 | 0.54 | 1.90366 | 31.32 |
| G2 | 5 | 4.7637 | 1.68 | | |
| G2 | 6 | ∞ | 0.51 | 1.83400 | 37.16 |
| G2 | 7 | 8.8409 | 0.10 | | |
| G2 | 8 | 6.7887 | 2.04 | 1.94595 | 17.98 |
| G2 | 9 | 42.7101 | D9 | | |
| | 10 (STOP) | ∞ | 0.80 | | |
| G3 | 11 | 3.6076 | 3.01 | 1.58313 | 59.38 |
| G3 | 12 | −9.7956 | 0.50 | 1.92286 | 18.90 |
| G3 | 13 | 534706488.7983 | 0.17 | | |
| G3 | *14 | 5.0000 | 1.00 | 1.50957 | 56.38 |
| G3 | *15 | 3.0642 | D15 | | |
| G4 | 16 | 7.9810 | 1.85 | 1.62041 | 60.29 |
| G4 | 17 | 19.4303 | D17 | | |
| | 18 | ∞ | 0.85 | 1.51680 | 64.20 |
| | 19 | ∞ | | | |

(*: ASPHERIC SURFACE)

TABLE 8

EXAMPLE 3 - ZOOM DATA

|  | WIDE END | MIDDLE | TELE END |
|---|---|---|---|
| f | 5.31 | 11.53 | 25.03 |
| Fno. | 4.02 | 4.84 | 6.07 |
| 2ω | 80.8 | 37.5 | 17.1 |
| D3 | 0.300 | 5.757 | 11.551 |

TABLE 8-continued

EXAMPLE 3 - ZOOM DATA

|  | WIDE END | MIDDLE | TELE END |
|---|---|---|---|
| D9 | 9.016 | 3.194 | 0.644 |
| D15 | 4.115 | 4.740 | 10.923 |
| D17 | 3.011 | 5.302 | 3.130 |

TABLE 9

EXAMPLE 3 - ASPHERIC DATA

| COEFFICIENT | 14TH SURFACE | 15TH SURFACE |
|---|---|---|
| K | −16.51279320 | −0.97751321 |
| A3 | 6.13761685E−04 | 7.11684812E−03 |
| A4 | 1.49324058E−02 | −2.10385660E−02 |
| A5 | −2.09820853E−02 | 4.26044348E−02 |
| A6 | 1.17530957E−02 | −3.97185672E−02 |
| A7 | −7.28205247E−04 | 1.11239388E−02 |
| A8 | −2.71494274E−03 | 4.92454546E−03 |
| A9 | −2.37205117E−03 | −2.56481402E−03 |
| A10 | 1.93576934E−03 | −4.09892994E−05 |
| A11 | 8.62713918E−04 | −3.63990306E−04 |

TABLE 9-continued

EXAMPLE 3 - ASPHERIC DATA

| COEFFICIENT | 14TH SURFACE | 15TH SURFACE |
|---|---|---|
| A12 | −2.45473505E−04 | 1.01275876E−04 |
| A13 | −4.97682684E−04 | 1.62294655E−04 |
| A14 | 1.79388663E−04 | −5.38829476E−05 |

TABLE 10

EXAMPLE 4 - BASIC LENS DATA

| | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G1 | 1 | 22.0365 | 0.63 | 1.94595 | 17.98 |
| | 2 | 14.9504 | 2.31 | 1.83481 | 42.71 |
| | 3 | ∞ | D3 | | |
| G2 | 4 | 248.5130 | 0.54 | 1.90366 | 31.32 |
| | 5 | 4.7366 | 1.69 | | |
| | 6 | ∞ | 0.51 | 1.83400 | 37.16 |
| | 7 | 9.1740 | 0.10 | | |
| | 8 | 6.8221 | 2.00 | 1.94595 | 17.98 |
| | 9 | 37.7298 | D9 | | |
| | 10 (STOP) | ∞ | 0.80 | | |
| G3 | 11 | 3.5098 | 3.01 | 1.58313 | 59.38 |
| | 12 | −9.6664 | 0.50 | 1.92286 | 18.90 |
| | 13 | −2755795861.7185 | 0.20 | | |
| | *14 | 5.0000 | 0.90 | 1.50957 | 56.38 |
| | *15 | 2.9631 | D15 | | |
| G4 | 16 | 8.9999 | 1.85 | 1.62041 | 60.29 |
| | 17 | 40.0000 | D17 | | |
| | 18 | ∞ | 0.85 | 1.51680 | 64.20 |
| | 19 | ∞ | | | |

(*: ASPHERIC SURFACE)

TABLE 11

EXAMPLE 4 - ZOOM DATA

| | WIDE END | MIDDLE | TELE END |
|---|---|---|---|
| f | 5.17 | 11.23 | 24.38 |
| Fno. | 3.93 | 4.65 | 6.07 |
| 2ω | 82.4 | 38.1 | 17.5 |
| D3 | 0.300 | 5.559 | 11.039 |
| D9 | 8.992 | 2.859 | 0.679 |
| D15 | 3.821 | 3.665 | 11.016 |
| D17 | 3.159 | 5.919 | 3.428 |

TABLE 12

EXAMPLE 4 - ASPHERIC DATA

| COEFFICIENT | 14TH SURFACE | 15TH SURFACE |
|---|---|---|
| K | −2.87695823 | −0.36193739 |
| A3 | 1.73964820E−03 | 3.33556400E−03 |
| A4 | −1.21414862E−02 | −1.08618932E−02 |
| A5 | 3.05712090E−03 | 1.16998038E−02 |
| A6 | −5.75353328E−03 | −1.37564791E−02 |
| A7 | 1.40555220E−03 | 5.99016548E−03 |
| A8 | 1.76925022E−03 | 5.22434285E−04 |
| A9 | −1.59263111E−03 | −1.32267356E−03 |
| A10 | 3.55582903E−04 | 3.32171336E−04 |

TABLE 13

EXAMPLE 5 - BASIC LENS DATA

| | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G1 | 1 | 22.2254 | 0.63 | 1.94595 | 17.98 |
| | 2 | 14.9504 | 2.26 | 1.83481 | 42.71 |
| | 3 | 5664626.3292 | D3 | | |
| G2 | 4 | 364.8992 | 0.54 | 1.90366 | 31.32 |
| | 5 | 4.8417 | 1.65 | | |
| | 6 | 159.5299 | 0.51 | 1.83400 | 37.16 |
| | 7 | 9.3858 | 0.10 | | |
| | 8 | 6.8630 | 1.95 | 1.94595 | 17.98 |
| | 9 | 32.0734 | D9 | | |
| | 10 (STOP) | ∞ | 0.80 | | |
| G3 | 11 | 3.5145 | 3.00 | 1.58913 | 61.14 |
| | 12 | −11.4589 | 0.50 | 1.92286 | 18.90 |
| | 13 | 2166.7552 | 0.20 | | |
| | *14 | 4.8679 | 0.92 | 1.80348 | 40.44 |
| | *16 | 3.0817 | D15 | | |
| G4 | 16 | 8.9999 | 1.80 | 1.62041 | 60.29 |
| | 17 | 40.7757 | D17 | | |
| | 18 | ∞ | 0.85 | 1.51680 | 64.20 |
| | 19 | ∞ | | | |

(*: ASPHERIC SURFACE)

TABLE 14

EXAMPLE 5 - ZOOM DATA

|  | WIDE END | MIDDLE | TELE END |
|---|---|---|---|
| f | 5.17 | 11.23 | 24.38 |
| Fno. | 3.94 | 4.67 | 6.02 |
| 2ω | 80.1 | 36.8 | 17.0 |
| D3 | 0.300 | 5.497 | 11.142 |
| D9 | 9.541 | 3.090 | 0.720 |
| D15 | 3.913 | 3.542 | 10.267 |
| D17 | 2.812 | 5.644 | 3.322 |

TABLE 15

EXAMPLE 5 - ASPHERIC DATA

| COEFFICIENT | 14TH SURFACE | 15TH SURFACE |
|---|---|---|
| K  | −1.31940811    | −0.62283285    |
| A3 | −3.53682612E−04 | 8.95494562E−04 |
| A4 | −4.64129650E−03 | −2.73285820E−03 |
| A5 | −4.22059096E−03 | 1.34207959E−03 |
| A6 | 1.00922802E−03 | −3.94619359E−03 |
| A7 | −2.05862347E−04 | 1.57094850E−03 |
| A8 | −2.94607675E−04 | 3.72756223E−04 |
| A9 | 9.25510785E−05 | −5.79770243E−04 |
| A10 | −1.25516741E−05 | 1.62013671E−04 |

TABLE 16

EXAMPLE 6 - BASIC LENS DATA

|  | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G1 | 1 | 22.5060 | 0.63 | 1.94595 | 17.98 |
|    | 2 | 14.9504 | 2.31 | 1.83481 | 42.71 |
|    | 3 | −938.1489 | D3 | | |
| G2 | 4 | 986.9091 | 0.54 | 1.88300 | 40.76 |
|    | 5 | 4.8417 | 1.65 | | |
|    | 6 | 113.4935 | 0.51 | 1.88300 | 40.76 |
|    | 7 | 9.7605 | 0.13 | | |
|    | 8 | 6.8766 | 1.95 | 1.92286 | 20.88 |
|    | 9 | 30.1080 | D9 | | |
| G3 | 10 (STOP) | ∞ | 0.80 | | |
|    | 11 | 3.5538 | 3.02 | 1.62041 | 60.29 |
|    | 12 | −9.5310 | 0.60 | 1.92000 | 21.55 |
|    | 13 | 39.7011 | 0.20 | | |
|    | *14 | 5.3459 | 0.89 | 1.56865 | 58.62 |
|    | *15 | 3.3722 | D15 | | |
| G4 | 16 | 8.9999 | 1.80 | 1.60934 | 47.74 |
|    | 17 | 40.0000 | D17 | | |
|    | 18 | ∞ | 0.85 | 1.51680 | 64.20 |
|    | 19 | ∞ | | | |

(*: ASPHERIC SURFACE)

TABLE 17

EXAMPLE 6 - ZOOM DATA

|  | WIDE END | MIDDLE | TELE END |
|---|---|---|---|
| f | 5.17 | 11.23 | 24.37 |
| Fno. | 3.93 | 4.66 | 6.06 |
| 2ω | 82.5 | 38.0 | 17.5 |
| D3 | 0.300 | 5.341 | 10.917 |
| D9 | 9.375 | 2.968 | 0.730 |
| D15 | 3.772 | 3.372 | 10.595 |
| D17 | 2.981 | 5.911 | 3.369 |

TABLE 18

EXAMPLE 6 - ASPHERIC DATA

| COEFFICIENT | 14TH SURFACE | 15TH SURFACE |
|---|---|---|
| K  | −3.61387787 | 0.09751594 |
| A3 | 8.13204378E−04 | 2.02614939E−03 |
| A4 | −5.53037663E−03 | −4.44681983E−03 |
| A5 | −4.64110812E−03 | 7.28542019E−04 |
| A6 | 8.72720900E−04 | −3.88146890E−03 |
| A7 | −2.58331158E−04 | 1.72529579E−03 |
| A8 | −3.06479538E−04 | 4.16028769E−04 |
| A9 | 9.77868234E−05 | −5.95600076E−04 |
| A10 | −7.21253379E−06 | 1.59494294E−04 |

TABLE 19

EXAMPLE 7 - BASIC LENS DATA

|  | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G1 | 1 | 22.0224 | 0.63 | 1.94595 | 17.98 |
|  | 2 | 14.9504 | 2.26 | 1.83481 | 42.71 |
|  | 3 | −9141882.8007 | D3 |  |  |
| G2 | 4 | 326.0838 | 0.54 | 1.90366 | 31.32 |
|  | 5 | 4.8815 | 1.65 |  |  |
|  | 6 | 15909143.7977 | 0.51 | 1.83400 | 37.16 |
|  | 7 | 9.4517 | 0.10 |  |  |
|  | 8 | 7.0135 | 1.95 | 1.94595 | 17.98 |
|  | 9 | 40.6066 | D9 |  |  |
|  | 10 (STOP) | ∞ | 0.80 |  |  |
| G3 | 11 | 3.5549 | 3.02 | 1.61800 | 63.33 |
|  | 12 | −12.2971 | 0.62 | 1.92286 | 20.88 |
|  | 13 | 27.8463 | 0.20 |  |  |
|  | *14 | 5.7258 | 0.89 | 1.56865 | 58.62 |
|  | *15 | 3.6062 | D15 |  |  |
| G4 | 16 | 8.9999 | 1.80 | 1.63910 | 59.54 |
|  | 17 | 40.0000 | D17 |  |  |
|  | 18 | ∞ | 0.85 | 1.51680 | 64.20 |
|  | 19 | ∞ |  |  |  |

(*: ASPHERIC SURFACE)

TABLE 20

EXAMPLE 7 - ZOOM DATA

|  | WIDE END | MIDDLE | TELE END |
|---|---|---|---|
| f | 5.17 | 11.23 | 24.37 |
| Fno. | 3.88 | 4.60 | 6.02 |
| 2ω | 82.6 | 38.1 | 17.5 |
| D3 | 0.300 | 5.591 | 10.908 |
| D9 | 9.334 | 3.047 | 0.637 |
| D15 | 3.565 | 3.729 | 10.769 |
| D17 | 3.163 | 5.575 | 3.200 |

TABLE 21

EXAMPLE 7 - ASPHERIC DATA

| COEFFICIENT | 14TH SURFACE | 15TH SURFACE |
|---|---|---|
| K | −3.87823989 | 0.28326688 |
| A3 | 3.72886064E−04 | 1.37004142E−03 |
| A4 | −5.61876746E−03 | −4.36019085E−03 |
| A5 | −4.64166188E−03 | 7.28158000E−04 |
| A6 | 8.72719367E−04 | −3.88147537E−03 |
| A7 | −2.58331159E−04 | 1.72529574E−03 |
| A8 | −3.06479538E−04 | 4.16028769E−04 |
| A9 | 9.77668234E−05 | −5.95600076E−04 |
| A10 | −7.21253379E−06 | 1.59494294E−04 |

TABLE 22

EXAMPLE 8 - BASIC LENS DATA

|  | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G1 | 1 | 22.2687 | 0.63 | 1.94595 | 17.98 |
|  | 2 | 14.9997 | 2.26 | 1.83481 | 42.71 |
|  | 3 | ∞ | D3 |  |  |
| G2 | 4 | 266.4489 | 0.54 | 1.90366 | 31.32 |
|  | 5 | 4.7142 | 1.61 |  |  |
|  | 6 | ∞ | 0.51 | 1.83400 | 37.16 |
|  | 7 | 9.7205 | 0.10 |  |  |
|  | 8 | 6.8886 | 1.80 | 1.94595 | 17.98 |
|  | 9 | 35.7702 | D9 |  |  |
|  | 10 (STOP) | ∞ | 0.80 |  |  |
| G3 | 11 | 3.5163 | 3.02 | 1.58913 | 61.14 |
|  | 12 | −11.1646 | 0.50 | 1.92286 | 18.90 |
|  | 13 | ∞ | 0.20 |  |  |
|  | *14 | 5.0713 | 0.91 | 1.80348 | 40.44 |
|  | *15 | 3.2472 | D15 |  |  |
| G4 | 16 | 8.9999 | 1.80 | 1.62041 | 60.29 |
|  | 17 | 35.1447 | D17 |  |  |

TABLE 22-continued

EXAMPLE 8 - BASIC LENS DATA

| Si (SURFACE NUMBER) | Ri (CURVATURE RADIUS) | Di (SURFACE INTERVAL) | Ndj (REFRACTIVE INDEX) | ν dj (ABBE NUMBER) |
|---|---|---|---|---|
| 18 | ∞ | 0.85 | 1.51680 | 64.20 |
| 19 | ∞ | | | |

(*: ASPHERIC SURFACE)

TABLE 23

EXAMPLE 8 - ZOOM DATA

| | WIDE END | MIDDLE | TELE END |
|---|---|---|---|
| f | 5.17 | 11.23 | 24.38 |
| Fno. | 3.89 | 4.64 | 5.96 |
| 2ω | 80.1 | 36.9 | 17.0 |
| D3 | 0.300 | 5.533 | 11.134 |
| D9 | 9.267 | 3.112 | 0.684 |
| D15 | 4.024 | 3.940 | 10.453 |
| D17 | 2.760 | 5.490 | 3.379 |

TABLE 24

EXAMPLE 8 - ASPHERIC DATA

| COEFFICIENT | 14TH SURFACE | 15TH SURFACE |
|---|---|---|
| K | −1.22073552 | −0.53324730 |
| A3 | −3.64568136E−04 | 7.59374690E−04 |
| A4 | −4.56755836E−03 | −2.79929469E−03 |
| A5 | −4.21968912E−03 | 1.34133859E−03 |
| A6 | 1.00923370E−03 | −3.94619875E−03 |
| A7 | −2.05862320E−04 | 1.57094848E−03 |
| A8 | −2.94607675E−04 | 3.72756223E−04 |
| A9 | 9.25510785E−05 | −5.79770243E−04 |
| A10 | −1.25516741E−05 | 1.62013671E−04 |

TABLE 25

EXAMPLE 9 - BASIC LENS DATA

| | Si (SURFACE NUMBER) | Ri (CURVATURE RADIUS) | Di (SURFACE INTERVAL) | Ndj (REFRACTIVE INDEX) | ν dj (ABBE NUMBER) |
|---|---|---|---|---|---|
| G1 | 1 | 23.9992 | 0.60 | 1.94595 | 17.98 |
| | 2 | 17.4996 | 2.01 | 1.75500 | 52.32 |
| | 3 | −149.9971 | D3 | | |
| G2 | 4 | 1413188972.125 | 0.60 | 1.88300 | 40.76 |
| | 5 | 4.4767 | 1.15 | | |
| | 6 | 18.1124 | 0.55 | 1.88300 | 40.76 |
| | 7 | 7.5358 | 0.10 | | |
| | *8 | 6.8250 | 1.45 | 1.90681 | 21.20 |
| | *9 | 32.0725 | D9 | | |
| | 10 (STOP) | ∞ | D10 | | |
| G3 | 11 | 3.8000 | 3.06 | 1.61800 | 63.33 |
| | 12 | −29.7221 | 0.55 | 1.92286 | 20.88 |
| | 13 | 13.6907 | 0.20 | | |
| | *14 | 3.8061 | 0.90 | 1.80348 | 40.45 |
| | *15 | 3.5000 | D15 | | |
| G4 | 16 | 9.8789 | 1.70 | 1.50957 | 56.38 |
| | *17 | 117.7598 | D17 | | |
| | 18 | 00 | 0.85 | 1.51680 | 64.20 |
| | 19 | 00 | | | |

(*: ASPHERIC SURFACE)

TABLE 26

EXAMPLE 9 - ZOOM DATA

| | WIDE END | MIDDLE | TELE END |
|---|---|---|---|
| f | 5.14 | 11.17 | 24.25 |
| Fno. | 3.25 | 4.25 | 5.97 |
| 2ω | 80.1 | 36.4 | 17.1 |
| D3 | 0.300 | 5.493 | 10.947 |
| D9 | 7.274 | 2.796 | 1.048 |
| D10 | 2.100 | 0.600 | 0.600 |
| D15 | 3.070 | 2.269 | 11.920 |
| D17 | 3.370 | 6.580 | 2.520 |

TABLE 27

EXAMPLE 9 - ASPHERIC DATA

| COEFFICIENT | 8TH SURFACE | 9TH SURFACE |
|---|---|---|
| K | 0.59001142 | 1.99999916 |
| A3 | 8.23154310E−04 | 2.00644051E−04 |
| A4 | −1.11681786E−03 | −6.46475125E−04 |
| A5 | −4.05319458E−04 | −1.23550389E−03 |
| A6 | 5.43297991E−04 | 9.87929911E−04 |
| A7 | −1.17443712E−04 | −2.47610076E−04 |
| A8 | −8.76590391E−07 | −1.99191463E−05 |
| A9 | −1.96968281E−05 | −8.08380079E−06 |

TABLE 27-continued

EXAMPLE 9 - ASPHERIC DATA

| | | |
|---|---|---|
| A10 | 3.42807966E−06 | 3.06430639E−06 |
| A11 | 1.05198938E−06 | 2.24204275E−06 |
| A12 | 7.08225845E−07 | −7.89038685E−08 |
| A13 | −3.07465775E−07 | −8.19321446E−08 |
| A14 | −3.74675317E−08 | −4.57432002E−08 |
| A15 | 1.56754944E−08 | 9.62181907E−10 |
| A16 | −3.11029298E−09 | −4.78929129E−10 |
| A17 | 3.10075825E−09 | 1.09444185E−10 |
| A18 | −7.88902365E−10 | 2.29512906E−10 |
| A19 | −2.18883543E−11 | 1.02701392E−10 |
| A20 | 1.55756328E−11 | −3.33474001E−11 |

| | 14TH SURFACE | 15TH SURFACE | 17TH SURFACE |
|---|---|---|---|
| K | 1.31659345 | 1.27206093 | −2.00151513 |
| A3 | −1.95581761E−03 | −1.26308604E−03 | −5.71781637E−04 |
| A4 | 2.23997542E−03 | 6.32322595E−03 | 8.79059368E−04 |
| A5 | −5.33111937E−03 | −1.12512614E−03 | −3.91822623E−04 |
| A6 | 1.73096284E−03 | −4.35764035E−03 | −6.39295792E−05 |
| A7 | −6.94818226E−04 | 3.59449009E−03 | 3.64607360E−05 |
| A8 | −1.36180453E−04 | −1.61782156E−03 | 1.06271062E−05 |
| A9 | 2.36976417E−05 | 1.19790597E−05 | −5.72554798E−06 |
| A10 | −4.15590797E−06 | 9.50494083E−05 | 6.05720256E−07 |

TABLE 28

EXAMPLE 10 - BASIC LENS DATA

| | Si (SURFACE NUMBER) | Ri (CURVATURE RADIUS) | Di (SURFACE INTERVAL) | Ndj (REFRACTIVE INDEX) | ν dj (ABBE NUMBER) |
|---|---|---|---|---|---|
| G1 | 1 | 22.8777 | 0.64 | 1.94595 | 17.98 |
| | 2 | 14.9930 | 2.31 | 1.83481 | 42.71 |
| | 3 | −1839789.1276 | D3 | | |
| G2 | 4 | 15732468.8557 | 0.60 | 1.88300 | 40.76 |
| | 5 | 4.2000 | 1.46 | | |
| | *6 | 9.2603 | 0.70 | 1.50957 | 56.38 |
| | *7 | 6.4221 | 0.10 | | |
| | 8 | 7.1407 | 1.50 | 1.94595 | 17.98 |
| | 9 | 14.8055 | D9 | | |
| | 10 (STOP) | ∞ | D10 | | |
| G3 | 11 | 4.0000 | 2.96 | 1.61800 | 63.33 |
| | 12 | −12.5202 | 0.60 | 1.92286 | 20.88 |
| | 13 | 63.0002 | 0.10 | | |
| | *14 | 5.0028 | 0.90 | 1.80348 | 40.44 |
| | *15 | 4.0000 | D15 | | |
| G4 | *16 | 26.0000 | 1.60 | 1.50957 | 56.38 |
| | *17 | −25.0000 | D17 | | |
| | 18 | ∞ | 0.85 | 1.51680 | 64.20 |
| | 19 | ∞ | | | |

(*: ASPHERIC SURFACE)

TABLE 29

EXAMPLE 10 - ZOOM DATA

| | WIDE END | MIDDLE | TELE END |
|---|---|---|---|
| f | 5.13 | 11.13 | 24.17 |
| Fno. | 3.60 | 4.55 | 5.99 |
| 2ω | 80.4 | 36.7 | 17.1 |
| D3 | 0.300 | 5.358 | 11.314 |
| D9 | 8.291 | 3.095 | 1.142 |
| D10 | 2.100 | 0.600 | 0.600 |
| D15 | 3.741 | 1.767 | 10.744 |
| D17 | 3.535 | 7.715 | 3.253 |

TABLE 30

EXAMPLE 10 - ASPHERIC DATA

| CO-EFFI-CIENT | 6TH SURFACE | 7TH SURFACE | 14TH SURFACE |
|---|---|---|---|
| K | 0.00000000 | 1.92124055 | −9.99982639 |
| A3 | −8.96287811E−03 | −9.90924711E−03 | −5.23600239E−03 |
| A4 | 1.19906072E−02 | 1.07004675E−02 | 2.20777155E−02 |
| A5 | −1.04248327E−02 | −8.01668238E−03 | −1.46792817E−02 |
| A6 | 4.76898363E−03 | 1.63710993E−03 | 6.49192987E−03 |
| A7 | −9.36732335E−04 | 2.95421315E−04 | −2.01748761E−03 |
| A8 | −6.54932008E−05 | −7.63118674E−05 | −4.73605702E−04 |
| A9 | 3.49320878E−05 | −3.81253372E−05 | 5.47856160E−04 |
| A10 | 5.93887336E−06 | −1.16825280E−06 | −8.28821199E−05 |
| A11 | −4.20551019E−07 | 2.72519759E−06 | −5.17996237E−05 |
| A12 | −6.13248430E−07 | 6.09783588E−07 | −2.63726402E−06 |
| A13 | −3.85582846E−08 | 6.92676672E−08 | 1.66957597E−05 |
| A14 | 1.82739261E−09 | −4.39383175E−08 | −3.78907599E−06 |
| A15 | 7.98688435E−09 | −1.71243011E−08 | — |
| A16 | 2.21560030E−09 | −1.53728821E−09 | — |
| A17 | 2.81494773E−11 | 2.32259934E−10 | — |
| A18 | −1.44867274E−10 | 3.04215816E−10 | — |
| A19 | −6.88667264E−11 | 9.42766341E−11 | — |
| A20 | 1.57430908E−11 | −2.85590691E−11 | — |

TABLE 30-continued

EXAMPLE 10 - ASPHERIC DATA

| | 15TH SURFACE | 16TH SURFACE | 17TH SURFACE |
|---|---|---|---|
| K | 1.00000000 | 0.00000000 | 0.00000000 |
| A3 | −4.49140913E−03 | 2.81480969E−03 | 9.80082254E−04 |
| A4 | 1.32796951E−02 | −4.80374912E−03 | 2.42414553E−03 |
| A5 | −9.73395763E−03 | 3.44084603E−03 | −6.15175727E−03 |
| A6 | 1.93151271E−03 | −1.42330071E−03 | 4.08795567E−03 |
| A7 | 1.30198736E−03 | 4.05948362E−04 | −8.49881049E−04 |
| A8 | −3.67783017E−04 | −9.23066896E−05 | −1.36210308E−04 |
| A9 | −3.81167232E−04 | −2.31901873E−05 | 3.15203332E−05 |
| A10 | −2.36754482E−05 | 8.42295399E−06 | 1.04027601E−05 |

TABLE 30-continued

EXAMPLE 10 - ASPHERIC DATA

| | | | |
|---|---|---|---|
| A11 | 7.66385266E−05 | 3.06252668E−06 | 1.49801076E−07 |
| A12 | 2.34106434E−05 | −2.76110733E−06 | −5.13452864E−07 |
| A13 | −1.56448174E−05 | −3.60661070E−07 | −1.00189098E−07 |
| A14 | 1.52174126E−06 | 5.80843124E−08 | 2.54794052E−08 |

TABLE 31

EXAMPLE 11 - BASIC LENS DATA

| | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G1 | 1 | 21.6495 | 0.63 | 1.94595 | 17.98 |
| | 2 | 16.0000 | 2.21 | 1.75500 | 52.32 |
| | 3 | −353.4727 | D3 | | |
| G2 | 4 | −195.1382 | 0.54 | 1.88300 | 40.76 |
| | 5 | 4.3088 | 1.35 | | |
| | *6 | 6.3555 | 0.70 | 1.50957 | 56.38 |
| | *7 | 5.1078 | 0.20 | | |
| | 8 | 7.9624 | 1.48 | 1.92286 | 18.90 |
| | 9 | 20.5007 | D9 | | |
| | 10 (STOP) | ∞ | D10 | | |
| G3 | 11 | 3.7000 | 3.22 | 1.58913 | 61.14 |
| | 12 | −9.7741 | 0.50 | 1.92286 | 20.88 |
| | 13 | ∞ | 0.20 | | |
| | *14 | 4.6092 | 0.90 | 1.80348 | 40.44 |
| | *15 | 3.2267 | D15 | | |
| G4 | *16 | 10.3654 | 1.70 | 1.50957 | 56.38 |
| | *17 | −226.9911 | D17 | | |
| | 18 | ∞ | 0.85 | 1.51680 | 64.20 |
| | 19 | ∞ | | | |

(*: ASPHERIC SURFACE)

TABLE 32

EXAMPLE 11 - ZOOM DATA

| | WIDE END | MIDDLE | TELE END |
|---|---|---|---|
| f | 5.13 | 11.14 | 24.19 |
| Fno. | 3.54 | 4.60 | 6.04 |
| 2ω | 81.2 | 37.1 | 17.1 |
| D3 | 0.300 | 5.003 | 11.151 |
| D9 | 8.470 | 3.050 | 0.990 |
| D10 | 2.100 | 0.600 | 0.600 |
| D15 | 2.992 | 2.497 | 10.468 |
| D17 | 3.463 | 6.514 | 3.219 |

TABLE 33

EXAMPLE 11 - ASPHERIC DATA

| CO-EFFI-CIENT | 6TH SURFACE | 7TH SURFACE | 14TH SURFACE |
|---|---|---|---|
| K | −5.48062200 | −0.52377633 | −1.61711975 |
| A3 | −2.10098522E−04 | −1.01410513E−03 | −2.50459129E−03 |
| A4 | 6.91651928E−04 | −1.60499305E−03 | −1.95744312E−03 |
| A5 | 3.68073726E−04 | 1.53284598E−04 | −7.04126020E−04 |
| A6 | −1.83447570E−04 | −9.24470861E−05 | −5.61329485E−04 |
| A7 | −1.40574564E−05 | −4.06487366E−05 | −6.87279253E−04 |
| A8 | 1.33156222E−06 | 6.23373101E−06 | 1.18289119E−04 |
| A9 | −3.40693976E−08 | 1.98505636E−06 | 4.51894653E−05 |
| A10 | 1.91593533E−07 | 1.34470670E−07 | −2.75415365E−05 |
| A11 | 9.13527202E−08 | −7.41092690E−08 | 1.93388227E−05 |
| A12 | 3.83910290E−08 | −4.19053661E−10 | −5.03081239E−06 |
| A13 | −1.50737166E−08 | −7.08431276E−09 | −4.20206598E−08 |
| A14 | 4.93153467E−10 | 1.87689148E−09 | −2.36526983E−08 |

EXAMPLE 11 - ASPHERIC DATA

| | | | |
|---|---|---|---|
| A15 | −1.24671497E−10 | −2.31309615E−10 | — |
| A16 | 6.98440858E−11 | 7.95115377E−11 | — |
| A17 | 6.01393023E−12 | 9.13589122E−12 | — |
| A18 | 1.40045038E−12 | 2.58771216E−13 | — |
| A19 | −5.96979135E−13 | −9.81235985E−13 | — |
| A20 | −1.34715974E−13 | −1.98698481E−13 | — |

| | 15TH SURFACE | 16TH SURFACE | 17TH SURFACE |
|---|---|---|---|
| K | −1.54390492 | 4.99395474 | −4.99123672E+01 |
| A3 | −3.26529937E−03 | 1.05252691E−03 | 1.23353699E−03 |
| A4 | 7.48948340E−03 | −1.73226946E−03 | −1.07898373E−03 |
| A5 | −2.43591868E−03 | 4.16396275E−04 | 1.12502699E−04 |
| A6 | −1.00598309E−04 | −4.70873381E−05 | 3.66654574E−05 |
| A7 | −9.00897046E−04 | −9.57730120E−06 | −4.90318805E−06 |
| A8 | 1.40693699E−04 | −1.96128314E−06 | −1.87587853E−06 |
| A9 | 6.14874197E−05 | 5.11843524E−08 | −6.79644941E−07 |
| A10 | 4.13192957E−05 | 5.99841476E−08 | 2.41833847E−08 |
| A11 | −1.37648363E−05 | −6.18749933E−09 | 6.20835436E−09 |
| A12 | 5.01503493E−07 | −1.47167786E−09 | 2.60050125E−09 |
| A13 | −5.42807412E−08 | −6.07381081E−10 | 3.65669230E−10 |
| A14 | 2.19275019E−08 | 1.02068953E−10 | −5.33783292E−11 |

TABLE 34

EXAMPLE 12 - BASIC LENS DATA

| | Si (SURFACE NUMBER) | Ri (CURVATURE RADIUS) | Di (SURFACE INTERVAL) | Ndj (REFRACTIVE INDEX) | νdj (ABBE NUMBER) |
|---|---|---|---|---|---|
| G1 | 1 | 24.0878 | 0.61 | 1.94595 | 17.98 |
| | 2 | 17.4997 | 2.01 | 1.75500 | 52.32 |
| | 3 | −150.0002 | D3 | | |
| G2 | 4 | −196.9623 | 0.54 | 1.88300 | 40.76 |
| | 5 | 4.3898 | 1.08 | | |
| | 6 | 10.4244 | 0.52 | 1.88300 | 40.76 |
| | 7 | 6.5821 | 0.20 | | |
| | *8 | 7.0000 | 1.46 | 2.00170 | 20.60 |
| | *9 | 20.4291 | D9 | | |
| | 10 (STOP) | ∞ | D10 | | |
| G3 | 11 | 3.7000 | 2.88 | 1.60311 | 60.64 |
| | 12 | −10.5463 | 0.50 | 1.92286 | 20.88 |
| | 13 | ∞ | 0.30 | | |
| | *14 | 4.8832 | 1.04 | 1.80348 | 40.44 |
| | *15 | 3.3423 | D15 | | |
| G4 | *16 | 10.5599 | 1.70 | 1.50957 | 56.38 |
| | *17 | −158.7366 | D17 | | |
| | 18 | ∞ | 0.85 | 1.51680 | 64.20 |
| | 19 | ∞ | | | |

(*: ASPHERIC SURFACE)

TABLE 35

EXAMPLE 12 - ZOOM DATA

| | WIDE END | MIDDLE | TELE END |
|---|---|---|---|
| f | 5.13 | 11.13 | 24.16 |
| Fno. | 3.27 | 4.31 | 6.07 |
| 2ω | 80.7 | 36.7 | 17.2 |
| D3 | 0.300 | 5.266 | 10.793 |
| D9 | 7.647 | 3.011 | 1.271 |
| D10 | 2.100 | 0.600 | 0.600 |
| D15 | 2.912 | 2.538 | 11.819 |
| D17 | 3.335 | 6.349 | 2.572 |

TABLE 36

EXAMPLE 12 - ASPHERIC DATA

| CO-EFFI-CIENT | 8TH SURFACE | 9TH SURFACE | 14TH SURFACE |
|---|---|---|---|
| K | 1.58418049 | 36.40334399 | −1.89208281 |
| A3 | −2.66737899E−04 | −8.98040823E−04 | −1.81035569E−03 |
| A4 | −1.05444792E−03 | −9.63711679E−04 | −1.67362132E−03 |
| A5 | 7.43180761E−04 | 2.76448455E−04 | 7.60390665E−05 |
| A6 | −2.09026797E−04 | −2.34081544E−04 | −4.93604369E−04 |
| A7 | −3.33108117E−05 | −1.09761285E−05 | −6.84713190E−04 |
| A8 | 5.60197433E−06 | −2.44376999E−07 | 9.80054833E−05 |
| A9 | 1.87846716E−06 | 6.22471533E−07 | 2.64339074E−05 |
| A10 | −3.20601494E−07 | 5.70358692E−07 | −1.12986545E−05 |
| A11 | −1.35618004E−07 | −7.11311614E−08 | 1.26434168E−05 |
| A12 | 2.17275107E−08 | −3.96861254E−08 | −3.72036681E−06 |
| A13 | −9.95557580E−09 | −1.27370180E−08 | −4.20206598E−08 |
| A14 | 4.27121329E−09 | 3.80121056E−09 | −2.36526983E−08 |
| A15 | 3.14612653E−10 | 1.65198436E−10 | — |
| A16 | 6.12573597E−11 | 5.56129081E−11 | — |
| A17 | −8.26152304E−12 | 5.57745179E−11 | — |
| A18 | −8.19994112E−12 | −8.45578344E−12 | — |
| A19 | 1.36785811E−12 | −4.66826491E−12 | — |
| A20 | −1.96914934E−12 | −1.82620479E−12 | — |

| | 15TH SURFACE | 16TH SURFACE | 17TH SURFACE |
|---|---|---|---|
| K | −2.39479570 | 4.36186872 | −9.19869872E+01 |
| A3 | −1.94084209E−03 | −6.91105452E−05 | 7.99764998E−04 |
| A4 | 9.45051176E−03 | 1.32690766E−04 | 8.81870428E−05 |
| A5 | −7.06159379E−04 | 6.76073013E−05 | −5.83723031E−05 |
| A6 | −1.47078084E−04 | −7.25028181E−05 | −1.16024625E−05 |
| A7 | −1.03758163E−03 | −9.88694666E−06 | −5.22388420E−06 |
| A8 | −2.25654655E−05 | 7.53704924E−07 | −4.91810037E−07 |
| A9 | 1.06639491E−04 | 4.05285218E−07 | −2.07912279E−07 |
| A10 | 5.79530291E−05 | 9.27307815E−08 | 5.17732469E−08 |
| A11 | −1.95356608E−05 | −5.02746690E−09 | 1.07774434E−08 |
| A12 | 1.38420746E−06 | −4.11327498E−09 | 1.78120535E−09 |
| A13 | −5.42807412E−08 | −8.29903611E−10 | −2.68325262E−11 |
| A14 | 2.19275019E−08 | −1.89557906E−12 | −2.41484692E−10 |

Other Numerical Data about Examples

[Table 37] shows values related to the formulas for all of the examples. As [Table 37] shows, values of each example are within the numerical ranges defined by the formulas.

TABLE 37

| FORMULA NUMBER | EXAMPLE 1 | EXAMPLE 2 | EXAMPLE 3 | EXAMPLE 4 | EXAMPLE 5 | EXAMPLE 6 |
|---|---|---|---|---|---|---|
| (1) | 0.43 | 0.40 | 0.39 | 0.41 | 0.36 | 0.38 |
| (2) | 5.47 | 5.47 | 5.38 | 5.43 | 5.48 | 5.44 |
| (3) | −1.23 | −1.22 | −1.23 | −1.24 | −1.28 | −1.26 |
| (4) | 0.79 | 0.83 | 1.10 | 1.01 | 1.01 | 0.99 |
| (5) | 0.777 | 0.803 | 0.753 | 0.774 | 0.745 | 0.774 |
| (6) | 17.98 | 17.98 | 17.98 | 17.98 | 17.98 | 17.98 |

TABLE 37-continued

| | | | | | | |
|---|---|---|---|---|---|---|
| (7) | 24.73 | 24.73 | 24.73 | 24.73 | 24.73 | 24.73 |
| (8) | 18.90 | 18.90 | 18.90 | 18.90 | 18.90 | 21.55 |
| (9) | 41.74 | 42.24 | 40.48 | 40.48 | 42.24 | 38.74 |

| FORMULA NUMBER | EXAMPLE 7 | EXAMPLE 8 | EXAMPLE 9 | EXAMPLE 10 | EXAMPLE 11 | EXAMPLE 12 |
|---|---|---|---|---|---|---|
| (1) | 0.38 | 0.38 | 0.45 | 0.38 | 0.38 | 0.45 |
| (2) | 5.42 | 5.49 | 5.81 | 5.73 | 5.74 | 5.86 |
| (3) | −1.29 | −1.26 | −1.27 | −1.26 | −1.35 | −1.30 |
| (4) | 1.03 | 0.97 | 0.87 | 0.97 | 0.96 | 0.84 |
| (5) | 0.774 | 0.745 | 0.750 | 0.752 | 0.751 | 0.752 |
| (6) | 17.98 | 17.98 | 17.98 | 17.98 | 17.98 | 17.98 |
| (7) | 24.73 | 24.73 | 24.73 | 24.73 | 24.73 | 24.73 |
| (8) | 20.88 | 18.90 | 18.90 | 18.90 | 18.90 | 18.90 |
| (9) | 42.45 | 41.74 | 42.24 | 40.48 | 40.48 | 42.24 |

[Aberration Performance]

FIGS. 13A through 13D are diagrams illustrating spherical aberration, astigmatism, distortion, and lateral chromatic aberration of the zoom lens of Numerical Example 1, respectively, at wide end. FIGS. 14A through 14D are diagrams illustrating similar aberrations of the zoom lens of Numerical Example 1 in middle range. Further, FIGS. 15A through 15D are diagrams illustrating similar aberrations of the zoom lens of Numerical Example 1 at tele end. Each of the diagrams illustrates aberrations, using d-line (587.6 nm) as reference wavelength. Further, the diagrams of spherical aberrations and lateral chromatic aberrations illustrate aberrations also for the wavelengths of 460 nm and 615 nm. In the diagrams of astigmatism, solid lines represent aberrations in a sagittal direction, and broken lines represent aberrations in a tangential direction. Further, Fno represents F-number, and ω represents a half angle of view.

Similarly, FIGS. 16A through 16D are diagrams illustrating spherical aberration, astigmatism, distortion, and lateral chromatic aberration of the zoom lens of Numerical Example 2, respectively, at wide end. FIGS. 17A through 17D are diagrams illustrating similar aberrations of the zoom lens of Numerical Example 2 in middle range. Further, FIGS. 18A through 18D are diagrams illustrating similar aberrations of the zoom lens of Numerical Example 2 at tele end. Similarly, FIGS. 19A-19D through FIGS. 48A-48D show aberrations for the zoom lenses of Numerical Example 3 through 12.

As the numerical data and the diagrams illustrating aberrations show, each of the examples corrects aberrations in an excellent manner in each variable magnification range. Further, it is possible to provide zoom lenses that are compact as a whole, and which have wide angles of view and high variable magnification ratios.

The present invention is not limited to the aforementioned embodiments and examples, and various modifications are possible. For example, the curvature radius of each lens element, the surface interval, the refractive index and the like are not limited to the values in the aforementioned numerical examples, but may be other values.

What is claimed is:

1. A zoom lens comprising:
a first lens group having positive refractive power;
a second lens group having negative refractive power;
a third lens group having positive refractive power; and
a fourth lens group having positive refractive power, which are sequentially arranged from the object side of the zoom lens,
wherein the magnification of the zoom lens is changed from wide end to tele end by moving each of at least one of the lens groups in such a manner that a distance between the first lens group and the second lens group increases and that a distance between the second lens group and the third lens group decreases, and
wherein the first lens group is composed of a negative lens and a positive lens, and
wherein when the magnification of the zoom lens is changed from wide end to tele end, the first lens group moves toward the object side, the second lens group moves along a path convex toward the image side of the zoom lens, the third lens group monotonously moves only toward the object side, and the fourth lens group moves along a path convex toward the object side, and
wherein the following formulas are satisfied:

$$0.3 < X1/ft < 0.5 \qquad (1); \text{ and}$$

$$5.0 < f1/fw < 7.0 \qquad (2), \text{ where}$$

X1: the amount of movement of the first lens group when the magnification is changed from wide end to tele end,
ft: the focal length of the entire system of the zoom lens at tele end,
f1: a combined focal length of the first lens group, and
fw: the focal length of the entire system of the zoom lens at wide end.

2. An imaging lens, as defined in claim 1,
wherein the following formula is further satisfied:

$$-1.4 < f2/fw < -1.2 \qquad (3), \text{ where}$$

f2: a combined focal length of the second lens group.

3. A zoom lens, as defined in claim 1, wherein the following formula is further satisfied:

$$0.6 < \beta 2t \cdot \beta 3w / (\beta 2w \cdot \beta 3t) < 1.2 \qquad (4), \text{ where}$$

β2w: the lateral magnification ratio of the second lens group at wide end,
β2t: the lateral magnification ratio of the second lens group at tele end,
β3w: the lateral magnification ratio of the third lens group at wide end, and
β3t: the lateral magnification ratio of the third lens group at tele end.

4. A zoom lens, as defined in claim 1, wherein the following formula is further satisfied:

$$0.70 < IH/fw < 0.85 \qquad (5), \text{ where}$$

IH: maximum image height.

5. A zoom lens, as defined in claim 1, wherein the first lens group is a cemented lens composed of the negative lens and the positive lens, cemented together.

6. A zoom lens, as defined in claim 1, wherein the following formulas are further satisfied:

$$v1n < 20.0 \quad (6); \text{ and}$$

$$24 < v1p - v1n < 35 \quad (7), \text{ where}$$

$v1n$: the Abbe number of the negative lens in the first lens group for d-line, and $v1p$: the Abbe number of the positive lens in the first lens group for d-line.

7. A zoom lens, as defined in claim 1, wherein the second lens group is composed of two negative lenses and a positive lens, which are sequentially arranged from the object side of the zoom lens.

8. A zoom lens, as defined in claim 1, wherein the third lens group is composed of a cemented lens of a positive lens and a first negative lens, and a second negative lens, which are sequentially arranged from the object side of the zoom lens.

9. A zoom lens, as defined in claim 8, wherein the following formulas are further satisfied:

$$v3n < 20.0 \quad (8); \text{ and}$$

$$37 < v3p - v3n < 45 \quad (9), \text{ where}$$

$v3n$: the Abbe number of the first negative lens constituting the cemented lens in the third lens group for d-line, and $v3p$: the Abbe number of the positive lens constituting the cemented lens in the third lens group for d-line.

10. A zoom lens, as defined in claim 8, wherein at least a surface of the second negative lens in the third lens group is aspheric.

11. An imaging apparatus comprising:

a zoom lens, as defined in claim 1; and an imaging device that outputs an imaging signal based on an optical image formed by the zoom lens.

* * * * *